US008229324B2

(12) United States Patent
Takigawa et al.

(10) Patent No.: US 8,229,324 B2

(45) Date of Patent: Jul. 24, 2012

(54) COUPLING DEVICE, AND IMAGE FORMING APPARATUS

(75) Inventors: Junya Takigawa, Tokyo (JP); Takuro Kamiya, Kanagawa (JP); Hideaki Sugata, Kanagawa (JP); Yoshimi Asayama, Mie (JP)

(73) Assignees: Ricoh Company, Limited, Tokyo (JP); NTN Corporation, Osaka (JP)

( * ) Notice: Subject to any disclaimer, the term of this patent is extended or adjusted under 35 U.S.C. 154(b) by 595 days.

(21) Appl. No.: 12/385,389

(22) Filed: Apr. 7, 2009

(65) Prior Publication Data

US 2009/0196655 A1 Aug. 6, 2009

(30) Foreign Application Priority Data

Oct. 5, 2007 (JP) ................................ 2007-262218
Apr. 8, 2008 (JP) ................................ 2008-100781

(51) Int. Cl.

*G03G 15/00* (2006.01)
*G03G 15/10* (2006.01)
*G03G 15/08* (2006.01)
*G03G 15/01* (2006.01)
*G03G 15/20* (2006.01)
*F16H 33/00* (2006.01)

(52) U.S. Cl. ........ 399/167; 399/236; 399/239; 399/265; 399/302; 399/303; 399/308; 399/312; 399/313; 74/640

(58) Field of Classification Search .................. 399/167, 399/236, 239, 265, 302, 303, 308, 312, 313; 74/640

See application file for complete search history.

(56) References Cited

U.S. PATENT DOCUMENTS

| | | | | |
|---|---|---|---|---|
| 2007/0066407 | A1* | 3/2007 | Sakaguchi et al. | 464/140 |
| 2007/0196129 | A1* | 8/2007 | Takigawa et al. | 399/167 |
| 2007/0201901 | A1 | 8/2007 | Takigawa et al. | |
| 2007/0258729 | A1* | 11/2007 | Ehara et al. | 399/167 |
| 2009/0028597 | A1 | 1/2009 | Takigawa et al. | |
| 2009/0042656 | A1 | 2/2009 | Takigawa et al. | |
| 2009/0054164 | A1 | 2/2009 | Takigawa et al. | |
| 2010/0234112 | A1* | 9/2010 | Kohana et al. | 464/7 |

FOREIGN PATENT DOCUMENTS

| | | |
|---|---|---|
| JP | 2004-045603 | 2/2004 |
| JP | 2005-017758 | 1/2005 |

* cited by examiner

*Primary Examiner* — David Gray
*Assistant Examiner* — Joseph S Wong
(74) *Attorney, Agent, or Firm* — Harness, Dickey & Pierce, P.L.C.

(57) ABSTRACT

A coupling unit includes two constant velocity joints arranged in series in the shaft direction. The coupling unit couples a driven shaft and a drive shaft. Each constant velocity joint includes a ball non-retaining member and a ball retaining member. The ball non-retaining member has an annular space with one opened end and a plurality of track grooves extending in the shaft direction on an external wall surface of the annular space at a constant interval in a circumferential direction. The ball retaining member has a portion that engages with the annular space of the ball non-retaining member, and that retains a ball that slides along each of the track grooves formed in the ball non-retaining member.

20 Claims, 24 Drawing Sheets

WHEN UNIT IS MOUNTED

COUPLING DEVICE, AND IMAGE FORMING APPARATUS

CROSS-REFERENCE TO RELATED APPLICATIONS

The present application claims priority to and incorporates by reference the entire contents of Japanese application document 2007-262218 filed in Japan on Oct. 5, 2007 and Japanese priority document 2008-100781 filed in Japan on Apr. 8, 2008.

BACKGROUND OF THE INVENTION

1. Field of the Invention

The present invention relates to a coupling device, and an image forming apparatus.

2. Description of the Related Art

A typical electrophotogrphic image forming apparatus forms an image by developing an electrostatic latent image formed on an image carrier using a developer and transferring the latent image to a recording material. A typical process cartridge houses, in its housing that is detachable with respect to an apparatus body of an image forming apparatus, at least one of a charging unit, a developing unit, and a cleaning unit that are arranged at a circumference of a drum-shaped photoconductor, and an image carrier.

FIG. 29 is a schematic of a state before a process cartridge 201 is mounted on an image forming apparatus body, and FIG. 30 is a schematic of a state where the process cartridge 201 is mounted.

The process cartridge 201 includes a photoconductor 202, and a developing unit 205 as a driven unit. About the horizontal direction in these figures, the left side is the front side (the near side) of the image forming apparatus, and the right side is the rear side (the far side) of the image forming apparatus.

A drum shaft hole (not shown) is provided on a rear flange 202*b* of the photoconductor 202. A concave gear 221 having a conical pitch surface with the drum shaft hole as its center is provided on the outer surface of the rear flange 202*b*. A drum shaft hole 202*e* is provided on the center of a front flange 202*c*. The photoconductor 202 is supported by supporting units (not shown) provided on a rear surface plate 211, and a front surface plate 218 provided on both sides of the photoconductor 202 in the shaft direction. The developing unit 205 includes a developing roller 205*g* positioned by the rear surface plate 211, and the front surface plate 218. The developing unit 205 includes a developing gear 258, an idler shaft 259 provided on the rear surface plate 211, a driven gear 260 rotatably provided on the idler shaft 259.

A cylindrical mating frame 270 that mates with a shaft bearing 215 fixed to the drum shaft is provided on the rear surface plate 211, and a shaft bearing 271 is attached to the front surface plate 218.

The apparatus body includes a front plate 225, and a rear plate 291. A retaining plate 289 is fixed to the rear plate 291, and a drive motor 281 is attached to the retaining plate 289. The rear plate 291 rotatably supports a drum shaft 202*a* penetrating the photoconductor 202 in the shaft direction through a shaft bearing 290. A coupling unit 293 such as a coupling couples the drum shaft 202*a* linearly with a motor shaft 281*a* of the drive motor 281. A first pulley 286, a convex gear 220 having a conical pitch surface, and the shaft bearing 215 are fixed to the drum shaft 202*a*.

The rear plate 291, and the retaining plate 289 rotatably support a drive shaft 282 for rotation-driving the developing roller 205*g* through shaft bearings 284*a*, 284*b*. A second pulley 283 is fixed to the drive shaft 282, and a timing belt 285 is wrapped around the second pulley 283, and the first pulley 286. A drive gear 262 is fixed to the front end of the drive shaft 282. A shaft bearing 226 that supports the front end of the drum shaft 202*a* is provided on the front plate 225 of the apparatus body.

When the process cartridge 201 is mounted while the front plate 225 of the apparatus body is open, the drum shaft 202*a* penetrates the photoconductor 202 as shown in FIG. 30, and the concave gear 221, and the convex gear 220 mate with each other. Simultaneously, the cylindrical mating frame 270 mates with the shaft bearing 215 on the drum shaft 202*a*, and the process cartridge 201 is positioned to the apparatus body. On the developing unit 205 side, the driven gear 260, and the drive gear 262 mesh with each other.

In the image forming apparatus shown in FIGS. 29 and 30, the idler shaft 259 to which the driven gear 260 for rotation-driving a rotating body such as the developing roller 205*g* of the developing unit 205 arranged in the circumference of the photoconductor 202 is fixed to the rear surface plate 211 of the process cartridge 201. The drive shaft 282 to which the drive gear 262 that meshes with the driven gear 260 is fixed is supported: on the apparatus body side. Accordingly, when the process cartridge 201 is positioned to the apparatus body with the drum shaft 202*a* as a reference, the distance between the shaft center of the idler shaft 259 and the shaft center of the drive shaft 282 may vary beyond a predetermined range due to the accumulation of tolerance. When the distance of the shaft centers vary beyond a predetermined range, vibration is generated when the driven gear 260 and the drive gear 262 mesh with each other to transmit drive force. This vibration is transmitted to the photoconductor 202, and causes image degradation such as banding.

Japanese Patent Application Laid-open No. 2004-45603 discloses a coupling unit capable of transmitting drive force even when the shaft centers of the driven shaft and the drive shaft misalign with each other, and that prevents occurrence of vibration at the time of transmitting the drive force.

FIGS. 31A to 31C are schematic diagrams of a coupling 316 disclosed in Japanese Patent Application Laid-open No. 2004-45603. FIG. 31A is a schematic of a state before a drive shaft 320 and a driven shaft 315 are coupled with each other, and FIG. 31B is a schematic of a state after the drive shaft 320 and the driven shaft 315 are coupled with each other. FIG. 31C is a schematic of the coupling 316 seen from the drive shaft 320 side.

As shown in the figures, the coupling 316 includes a tubular insertion part 319 coupled with the driven shaft 315, and a shaft insertion part 318 to which the drive shaft 320 is inserted. A long guide hole W is provided on the tubular insertion part 319. The driven shaft 315 is inserted into the centrum of the tubular insertion part 319. The guide hole W is superposed on a through-hole (not shown) provided near the drive side tip of the driven shaft 315, and a slide pin 331 is inserted through the guide hole W, and is press-fitted to the through hole; thereby, the coupling 316 is attached to the driven shaft 315.

A spring bearing 332 is fixed to the driven shaft 315, and a coil spring 317 is disposed between the spring bearing 332, and the coupling 316; thereby, the coupling 316 is biased to the drive shaft side.

An inner diameter a of the tubular insertion part 319 is larger than a diameter b of the driven shaft 315, and the coupling 316 is attached to the driven shaft 315 with clearance Q therebetween. By providing the clearance Q between the driven shaft 315 and the tubular insertion part 319 of the coupling 316 in this way, the coupling 316 can oscillate about the slide pin 331.

As shown in FIG. 31C, two catch portions V protruding toward the shaft center are provided on the shaft insertion part 318 of the coupling 316. A through-hole (not shown) is provided near the tip of the drive shaft 320 on the driven shaft side, and a drive pin 330 is press-fitted in the through hole.

As shown in FIG. 31B, when the drive shaft 320 is inserted into the shaft insertion part 318 of the coupling 316 while the shaft center of the drive shaft 320, and the shaft center of the driven shaft 315 misalign with each other, the coupling 316 rotates about the slide pin 331, and inclines relative to the driven shaft 315. Because the coupling 316 inclines in this way, the drive pin 330 press-fitted to the drive shaft 320 can be inserted into the shaft insertion part 318. As a result, even when the shaft center of the drive shaft 320 and the shaft center of the driven shaft 315 misalign with each other, the drive pin 330 engages with a side surface Va of the catch portions V, and the drive force is properly transmitted to the driven shaft 315. Vibration is never generated at the time of transmitting the drive force. Accordingly, image degradation such as banding can be suppressed.

However, with the coupling 316 disclosed in Japanese Patent Application Laid-open No. 2004-45603, when the shaft centers of the driven shaft 315 and the drive shaft 320 misalign with each other, as shown in FIG. 32A, only one of the protrusions of the drive pin 330 that protrude from the drive shaft 320 apart from each other at an interval of 180 degrees engages with the catch portion V of the coupling 316. At the time of rotation, the protrusion of the drive pin 330 that engages with the catch portion V of the coupling 316 switches from one to another as shown in FIG. 32B. When the protrusion of the drive pin 330 that engages with the catch portion V of the coupling 316 has switched, the position at which the catch portion V of the coupling 316 engages with the drive pin 330 changes from the base of the protrusion to the tip of the protrusion of the drive pin 330. As the rotation continues, the position at which the catch portion V of the coupling 316 engages with the drive pin 330 moves to the shaft center side (the base side) of the drive shaft 320. The circumferential speed of the tip of the protrusion of the drive pin 330 is faster than that of the drive shaft side of the protrusion of the drive pin 330. Therefore, the rotation speed transmitted to the coupling 316 when the tip of the protrusion of the drive pin 330 engages with the catch portion V of the coupling 316 shown in FIG. 32B is faster than the rotation speed transmitted to the coupling 316 when the drive shaft side of the protrusion of the drive pin 330 engages with the catch portion V of the coupling 316 as shown in FIG. 32A. As a result, rotational irregularity occurs in the developing roller 205*g* in the coupling of Japanese Patent Application Laid-open No. 2004-45603. Rotational irregularity of the developing roller 205*g* causes toner concentration irregularities resulting in image degradation. Concretely, when the rotation speed of the developing roller 205*g* is slow, the amount of developer that adheres to the photoconductor 202 is small, and when the rotation speed of the developing roller 205*g* is fast, the amount of developer that adheres to the photoconductor 202 is large.

SUMMARY OF THE INVENTION

It is an object of the present invention to at least partially solve the problems in the conventional technology.

According to an aspect of the present invention, there is provided a coupling device that couples a driven shaft and a drive shaft in a situation where a processing unit that can be detachably installed in an apparatus body is positioned with respect to the apparatus body, the drive shaft configured to be coupled to a drive source provided in the apparatus body, the driven shaft configured to be coupled to a rotating body provided in the processing unit, the rotating body being at least one of a developing roller, a drive roller of an intermediate image transfer belt, a drive roller of a paper conveying belt, a roller that conveys paper, and a secondary image transfer roller. The coupling device includes two constant velocity joints arranged in series in a shaft direction. The constant velocity joint includes a ball non-retaining member that has an annular space with one opened end, the ball non-retaining member having a plurality of track grooves extending in the shaft direction of the ball non-retaining member on an external wall surface or an inner wall surface of the annular space at a constant interval in a circumferential direction, and a ball retaining member having a portion that engages with the annular space of the ball non-retaining member, and that retains a ball that slides along each of the track grooves formed in the ball non-retaining member.

According to another aspect of the present invention, there is provided a image forming apparatus including an apparatus body that includes a drive shaft rotated by a driving force of a driving source; a processing unit that includes a driven shaft and a rotating body arranged on the driven shaft and that is configured to be detachably installed in the apparatus body, the rotating body being at least one of a developing roller, a drive roller of an intermediate image transfer belt, a drive roller of a paper conveying belt, a roller that conveys paper, and a secondary image transfer roller; and a coupling mechanism that couples the driven shaft and the drive shaft in a situation where the processing unit is positioned with respect to the apparatus body. The coupling mechanism includes two constant velocity joints arranged in series in a shaft direction. The constant velocity joint includes a ball non-retaining member that has an annular space with one opened end, the ball non-retaining member having a plurality of track grooves extending in the shaft direction of the ball non-retaining member on an external wall surface or an inner wall surface of the annular space at a constant interval in a circumferential direction, and a ball retaining member having a portion that engages with the annular space of the ball non-retaining member, and that retains a ball that slides along each of the track grooves formed in the ball non-retaining member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an electrophotographic printer (simply called a printer) will be explained as an image forming apparatus to which the present invention is applied.

Figure 1:
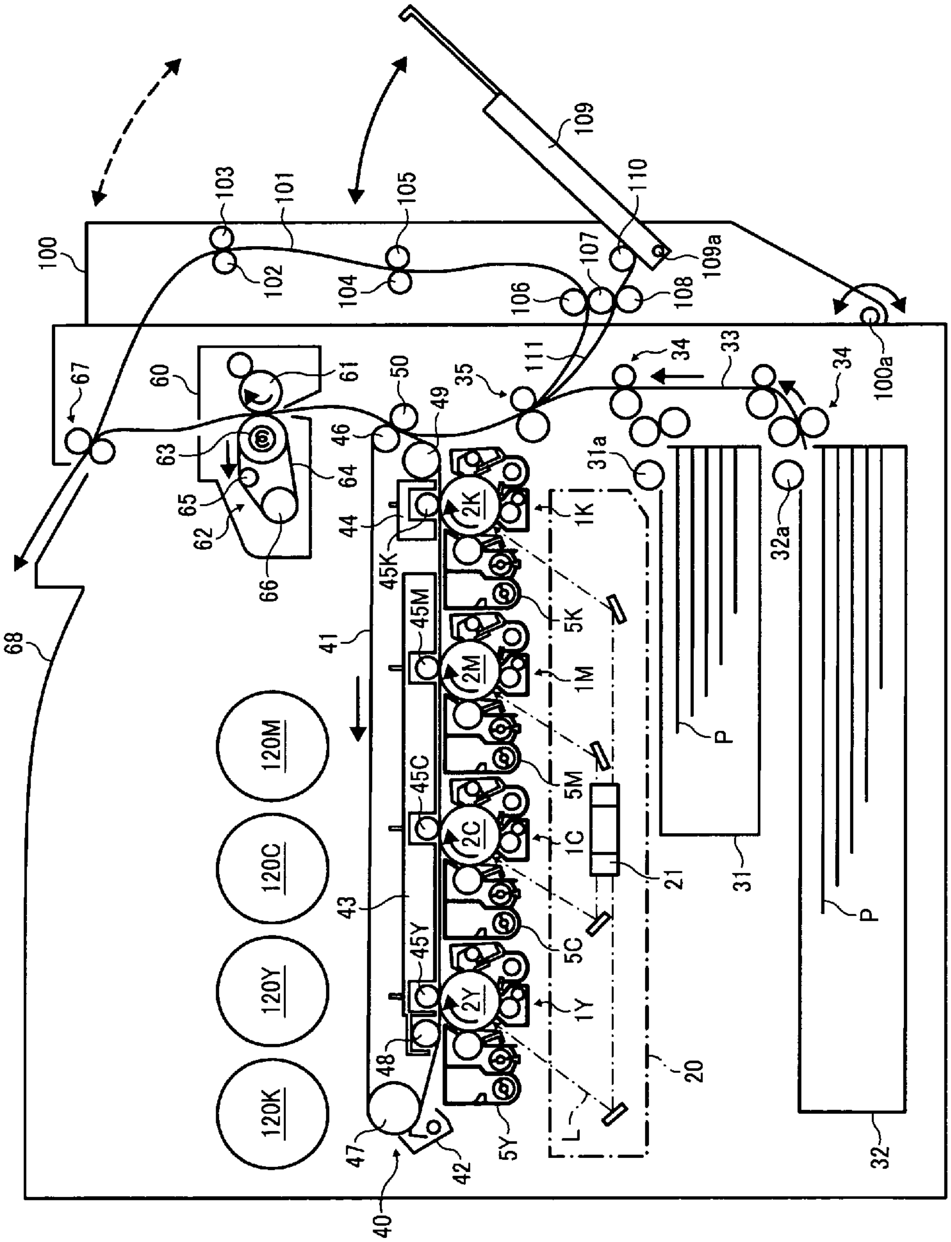
FIG. 1 is a schematic of a printer according to an embodiment of the present invention.

First, the basic configuration of a printer will be explained below. FIG. 1 is a schematic of a printer according to an embodiment of the present invention. The printer includes four process cartridges 1Y, 1C, 1M, and 1K for generating toner images of yellow, cyan, magenta, and black (Y, C, M, and K). The process cartridges 1Y, 1C, 1M, and 1K use Y, C, M, and K toners as image forming substances for forming images, but have the same configuration in other respects, and are replaced after their service life. In the following, because the configurations of the process cartridges 1Y, 1C, 1M, and 1K are the same, the symbols Y, C, M, and K for identifying colors are omitted.

Figure 2:
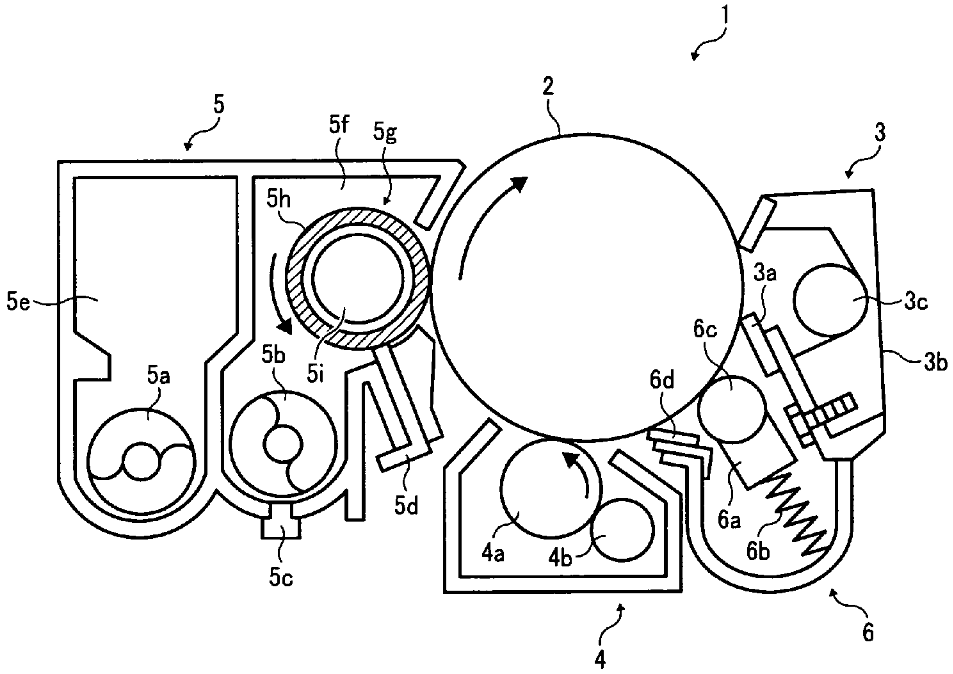
FIG. 2 is an enlarged view of a process cartridge.

As shown in FIG. 2, a process cartridge 1 includes, in its frame (not shown), a drum-shaped photoconductor 2 as an image carrier, a cleaning unit 3, a charging unit 4, a developing unit 5, and a lubricant applying unit 6. The process cartridge 1 is detachable with respect to a printer body, and accordingly consumable parts can be replaced collectively.

The charging unit 4 uniformly charges the surface of the photoconductor 2 that rotates clockwise in FIG. 2 by a driving unit (not shown). As shown in FIG. 2, the charging unit 4 employs a contactless charging roller system in which the photoconductor 2 is uniformly charged while a power supply (not shown) applies charging bias, and a charging roller 4*a* as a rotating body rotation-driven counterclockwise in FIG. 2 is made contactless with the photoconductor 2. The charging unit 4 may also employ a scorotron system, a corotron system, a contact roller system, or the like.

Charging bias applied to the contact system or the contactless system charging roller 4*a* may be direct current with alternate current superposed thereon, or direct current singly. Charging bias of direct current with alternate current superposed thereon applied to the contact system charging roller 4*a* provides an advantage that even when resistance of the charging roller 4*a* changes due to environmental changes because of constant current control of the alternate current, surface potential of the charging roller 4*a* is not influenced. However, it has a problem of increased cost of the power supply device, and noise of the alternating high frequency. On the other hand, charging bias of direct current with alternate current superposed thereon applied to the contactless system charging roller 4*a* cannot uniformly charge the photoconductor surface due to the influence of gap fluctuation between the photoconductor 2 and the charging roller 4*a*, and causes surface irregularity of images. Accordingly, a charging bias correcting unit corresponding to gap fluctuation becomes necessary.

The charging roller 4*a* may be rotated together with the photoconductor 2, or driven by drive force transmitted through a gear or the like from a drive source that drives the photoconductor 2. In general, the former is used in a slow machine, and the latter is used in a high-speed, high image quality machine.

In FIG. 2, a charging roller cleaner 4*b* that cleans the surface of the charging roller 4*a* is provided. The charging roller cleaner 4*b* can prevent the photoconductor 2 from not being charged to a desired potential due to stain adhered to the charging roller 4*a*. As a result, it is possible to prevent abnormal images due to a charging defect. The charging roller cleaner 4*b* is generally configured with melanin, and rotates along with the charging roller 4*a*.

The developing unit 5 includes a first housing unit 5*e* to which a first conveying screw 5*a* is disposed. The developing unit 5 also includes a second housing unit 5*f* in which a toner concentration sensor 5*c* made with a permeability sensor, a second conveying screw 5*b*, a developing roller 5*g*, a doctor blade 5*d*, and the like are disposed. The first and second housing units 5*e*, 5*f* incorporate developer (not shown) containing a magnetic carrier and negative electric toners. The first conveying screw 5*a* is rotation-driven by a driving unit (not shown) to convey the developer in the first housing unit 5*e* from the near side to the far side in FIG. 2. The developer enters the second housing unit 5*f* through a communicating opening (not shown) provided in a partition wall between the first housing unit 5*e* and the second housing unit 5*f*. The second conveying screw 5*b* in the second housing unit 5*f* is rotation-driven by a driving unit (not shown) to convey the developer from the far side to the near side in FIG. 2. The toner concentration of the developer being conveyed is detected by the toner concentration sensor 5*c* fixed to the bottom of the second housing unit 5*f*. The developing roller 5*g* that incorporates a magnet roller 5*i* in a developing sleeve 5*h* rotation-driven counterclockwise in FIG. 2 is disposed parallel to and above the second conveying screw 5*b* that conveys the developer. The developer conveyed by the second conveying screw 5*b* is drawn to the surface of the developing sleeve 5*h* by magnetic force generated by the magnet roller 5*i*. After the doctor blade 5*d* disposed to maintain a predetermined gap with the developing sleeve 5*h* regulates the layer thickness of the developer, the developer is conveyed to a development area opposite to the photoconductor 2, and adheres toners on an electrostatic latent image on the photoconductor 2. With this adhesion, a Y toner image is formed on the photoconductor 2. The developer that has consumed the toner after development is returned onto the second conveying screw 5*b* along with the rotation of the developing sleeve 5*h* of the developing roller 5*g*. When the developer is conveyed to the near side end in FIG. 2, the developer returns to the first housing unit 5*e* through a communicating opening (not shown).

The detection result of developer permeability by the toner concentration sensor 5*c* is sent to a controlling unit (not shown) as a voltage signal. Because the developer permeability is correlated with toner concentration of the developer, the toner concentration sensor 5*c* outputs voltage corresponding to the toner concentration. The controlling unit includes RAM, and stores therein data of Vtref that is a target value of output voltage from the toner concentration sensor 5*c*. The developing unit 5 compares the output voltage from the toner concentration sensor 5*c* and Vtref, and drives a toner supply device (not shown) for a length of time based on the comparison result. This driving makes the first housing unit 5*e* to supply an appropriate amount of toner to developer having a lowered toner concentration because toner is consumed after development. Accordingly, the toner concentration of developer in the first housing unit 5*e* is maintained within a predetermined range.

The cleaning unit 3 is for removing untransferred remaining toner not transferred and remained on the surface of the photoconductor 2 from the surface of the photoconductor 2. The cleaning unit 3 includes a cleaning blade 3*a* that abuts on the photoconductor surface in the counter direction. The cleaning unit 3 includes a collecting unit 3*b* that collects untransferred remaining toner on the surface of the photoconductor 2 removed by the cleaning blade 3*a*. The collecting unit 3*b* has a conveying auger 3*c* that conveys the toner collected by the collecting unit 3*b* to a waste toner bottle (not shown).

The untransferred remaining toner on the surface of the photoconductor 2 is removed by the cleaning blade 3*a*. The untransferred remaining toner accumulated on the tip of the cleaning blade 3*a* falls on the collecting unit 3*b*. The toner is conveyed by the conveying auger 3*c* as waste toner to the waste toner bottle (not shown), and is stored therein. The waste toner stored in the waster toner bottle is collected by a service engineer or the like. The untransferred remaining toner collected in the collecting unit 3*b* may be conveyed to the developing unit 5 and the like as recycle toner, and used again for development.

The lubricant applying unit 6 is for applying lubricant on the surface of the photoconductor 2 to lower the friction coefficient of the surface of the photoconductor 2. In the application of the lubricant on the surface of the photoconductor 2, the lubricant is molded into a solid to form a solid lubricant 6*a*, and the solid lubricant 6*a* is pressed to a fur brush 6*c* rotated by a pressure spring 6*b* to apply the lubricant on the photoconductor 2 through the fur brush 6*c*. ZnSt (Zinc stearate) is most generally used for the lubricant. Insulating PET, conductive PET, acrylic fiber or the like is used for the brush of the fur brush 6*c*. The lubricant applied to the photoconductor surface is made to have uniform thickness by a lubricant applying blade 6*d*, and is fixed on the photoconductor surface. It becomes possible to prevent filming of the photoconductor 2 by applying the lubricant on the surface of the photoconductor 2.

As shown in FIG. 1, an optical writing unit 20 is disposed below the process cartridges 1Y, 1C, 1M, and 1K. The optical writing unit 20 as a latent image forming unit irradiates a photoconductor of each one of the process cartridges 1Y, 1C, 1M, and 1K with laser light L emitted based on image information. Thereby, an electrostatic latent image for Y, C, M, and K is formed on photoconductors 2Y, 2C, 2M, and 2K. The optical writing unit 20 irradiates the photoconductors 2Y, 2C, 2M, and 2K with the laser light L emitted from a light source to the photoconductors 2Y, 2C, 2M, and 2K through a plurality of optical lenses or mirrors while deflecting the laser light L by a polygon mirror 21 rotation-driven by a motor.

A first paper feeding cassette 31, and a second paper feeding cassette 32 are disposed overlapping one on top of the other in the lower part of the optical writing unit 20. A plurality of stacked image transfer paper P is housed in each of the paper feeding cassettes, and a first paper feeding roller 31*a*, and a second paper feeding roller 32*a* each abut on the top image transfer paper P. When the first paper feeding roller 31*a* is rotation-driven by a driving unit (not shown) counterclockwise, the top image transfer paper P in the first paper feeding cassette 31 is discharged toward a paper feeding path 33 disposed extending in the vertical direction on the right of the cassette. Also, when the second paper feeding roller 32*a* is rotation-driven by a driving unit (not shown) counterclockwise, the top image transfer paper P in the second paper feeding cassette 32 is discharged toward the paper feeding path 33. A plurality of conveying roller pairs 34 is disposed in the paper feeding path 33, and the image transfer paper P fed to the paper feeding path 33 is conveyed from the lower part to the upper part in the paper feeding path 33 while being nipped between the rollers of the conveying roller pairs 34.

A registration roller pair 35 is disposed at the terminal of the paper feeding path 33. Immediately after the rollers of the registration roller pair 35 nip the image transfer paper P fed from the conveying roller pair 34, the registration roller pair 35 stops the rotation of the rollers. Then, the registration roller pair 35 feeds the image transfer paper P toward a secondary image transfer nip at an appropriate timing.

A transfer unit 40 is disposed above each one of the process cartridges 1Y, 1C, 1M, and 1K. The transfer unit 40 moves an intermediate image transfer belt 41 as an intermediate image transfer body endlessly counterclockwise while extending the intermediate image transfer belt 41. The transfer unit 40 includes a belt cleaning unit 42, a first bracket 43, and a second bracket 44 in addition to the intermediate image transfer belt 41. The transfer unit 40 also includes four primary image transfer rollers 45Y, 45C, 45M, and 45K, a secondary image transfer backup roller 46, a drive roller 47, an auxiliary roller 48, and a tension roller 49. The intermediate image transfer belt 41 is moved endlessly counterclockwise by rotation-drive of the drive roller 47 while being extended by the eight rollers. The four primary image transfer rollers 45Y, 45C, 45M, and 45K form primary image transfer nips while the intermediate image transfer belt 41 moved endlessly is nipped between the photoconductors 2Y, 2C, 2M, and 2K. An image transfer bias of an opposite polarity to that of the toner (for example, positive) is applied to the rear surface of the intermediate image transfer belt 41 (loop inner circumference surface). In the process that the intermediate image transfer belt 41 passes the primary image transfer nips for Y, C, M, and K along with its endless movement, Y, C, M, and K toner images on the photoconductors 2Y, 2C, 2M, and 2K are primarily transferred onto the front surface of the intermediate image transfer belt 41 overlapping one on top of the other. Thereby, a toner image of overlapped four colors (a four-color toner image) is formed on the intermediate image transfer belt 41.

The secondary image transfer backup roller 46 nips the intermediate image transfer belt 41 together with a secondary image transfer roller 50 disposed outside of the loop of the intermediate image transfer belt 41, and forms a secondary image transfer nip. The registration roller pair 35 explained above feeds the image transfer paper P nipped between the rollers toward the secondary image transfer nip at a timing synchronized with the four-color toner image on the intermediate image transfer belt 41. The four-color toner image on the intermediate image transfer belt 41 is secondarily transferred in a lump onto the image transfer paper P in the secondary image transfer nip due to the influence of a secondary image transfer electric field formed between the secondary image transfer roller 50 to which the secondary image transfer bias is applied and the secondary image transfer backup roller 46, and a nip pressure. The four-color toner image becomes a full color toner image combined with white color of the image transfer paper P.

Untransferred remaining toner not transferred onto the image transfer paper P adheres on the intermediate image transfer belt 41 after passing the secondary image transfer nip. The untransformed remaining toner is cleaned by the belt cleaning unit 42.

A fixing unit 60 including a pressure roller 61 and a fixing belt unit 62 is disposed above the secondary image transfer nip. The fixing belt unit 62 of the fixing unit 60 moves a fixing belt 64 endlessly counterclockwise while extending the fixing belt 64 by a heating roller 63, a tension roller 65, and a drive roller 66. The heating roller 63 incorporates a heating source such as a halogen lamp, and heats the fixing belt 64 from the rear surface side. The pressure roller 61 rotation-driven clockwise abuts on the front surface of the heated fixing belt 64 at a portion of the heating roller 63 where the fixing belt 64 is wrapped. Thereby, a fixing nip where the pressure roller 61 and the fixing belt 64 abut with each other is formed.

The image transfer paper P after passing through the secondary image transfer nip, and being separated from the intermediate image transfer belt 41 is fed into the fixing unit 60. In the process that the image transfer paper P is conveyed from the lower part to the upper part in FIG. 2 while being nipped by the fixing nip, the image transfer paper P is heated, and pressed by the fixing belt 64, and a full color toner image is fixed onto the image transfer paper P.

The image transfer paper P subjected to the fixation is discharged to the outside of the printer after passing between the rollers of a paper discharge roller pair 67. A stacking unit 68 is formed on the top surface of the housing of the printer body, and the image transfer paper P discharged to the outside of the printer by the paper discharge roller pair 67 is stacked sequentially on the stacking unit 68.

Four toner cartridges 120Y, 120C, 120M, and 120K that house Y C, M, and K toners are disposed above the transfer unit 40. The Y C, M, and K toners in the toner cartridges 120Y, 120C, 120M, and 120K are supplied properly to a developing unit of each of the process cartridges 1Y, 1C, 1M, and 1K. The toner cartridges 120Y, 120C, 120M, and 120K are detachable with respect to the printer body independently from the process cartridges 1Y, 1C, 1M, and 1K.

In the printer having such configuration, a toner image forming unit that forms a toner image on the image transfer paper P as a recording material is configured by combining the four process cartridges 1Y, 1C, 1M, and 1K, the optical writing unit 20, the transfer unit 40, and the like.

Figure 3A:
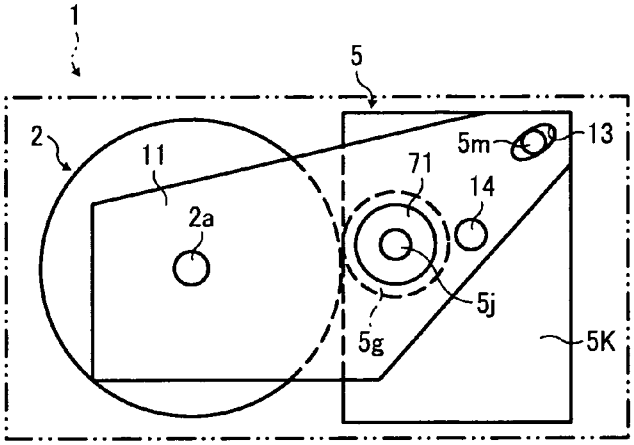
FIG. 3A is a front view of the process cartridge seen from the far side of an apparatus body.
Figure 3B:
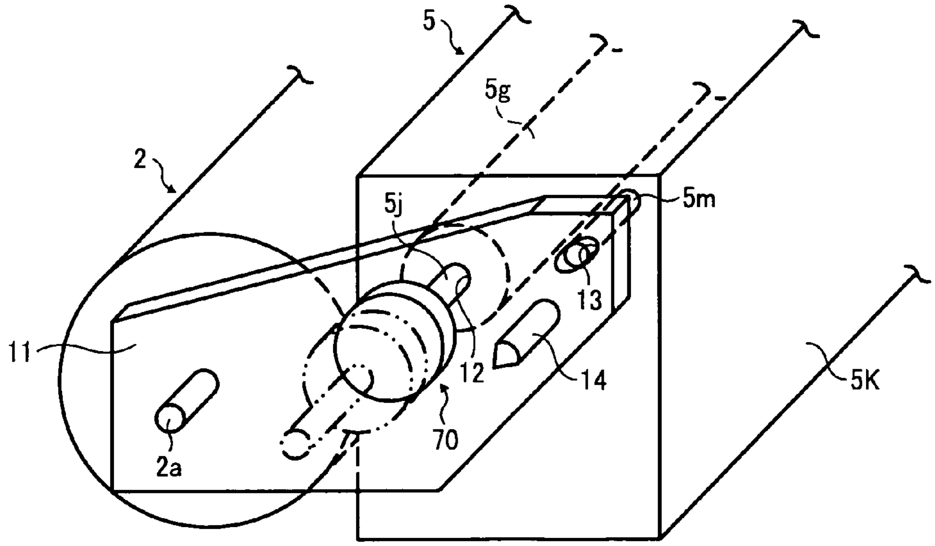
FIG. 3B is a perspective view of the process cartridge seen from the far side of the apparatus body.
Figure 4:
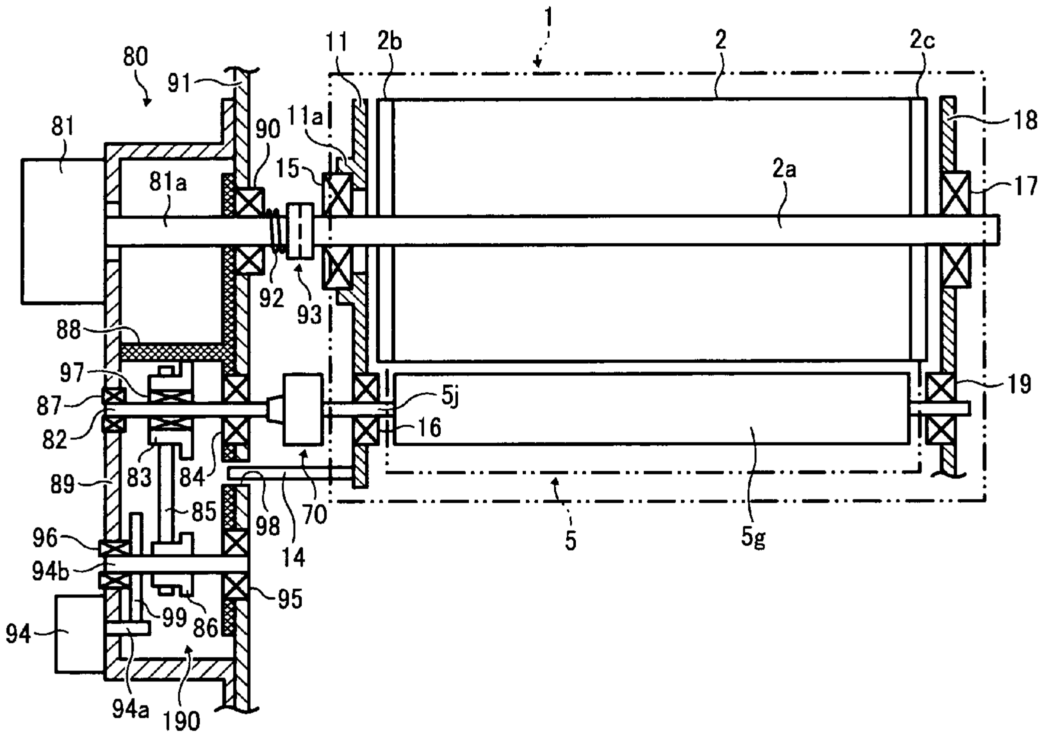
FIG. 4 is a schematic of the process cartridge mounted on the apparatus body.
Figure 5:
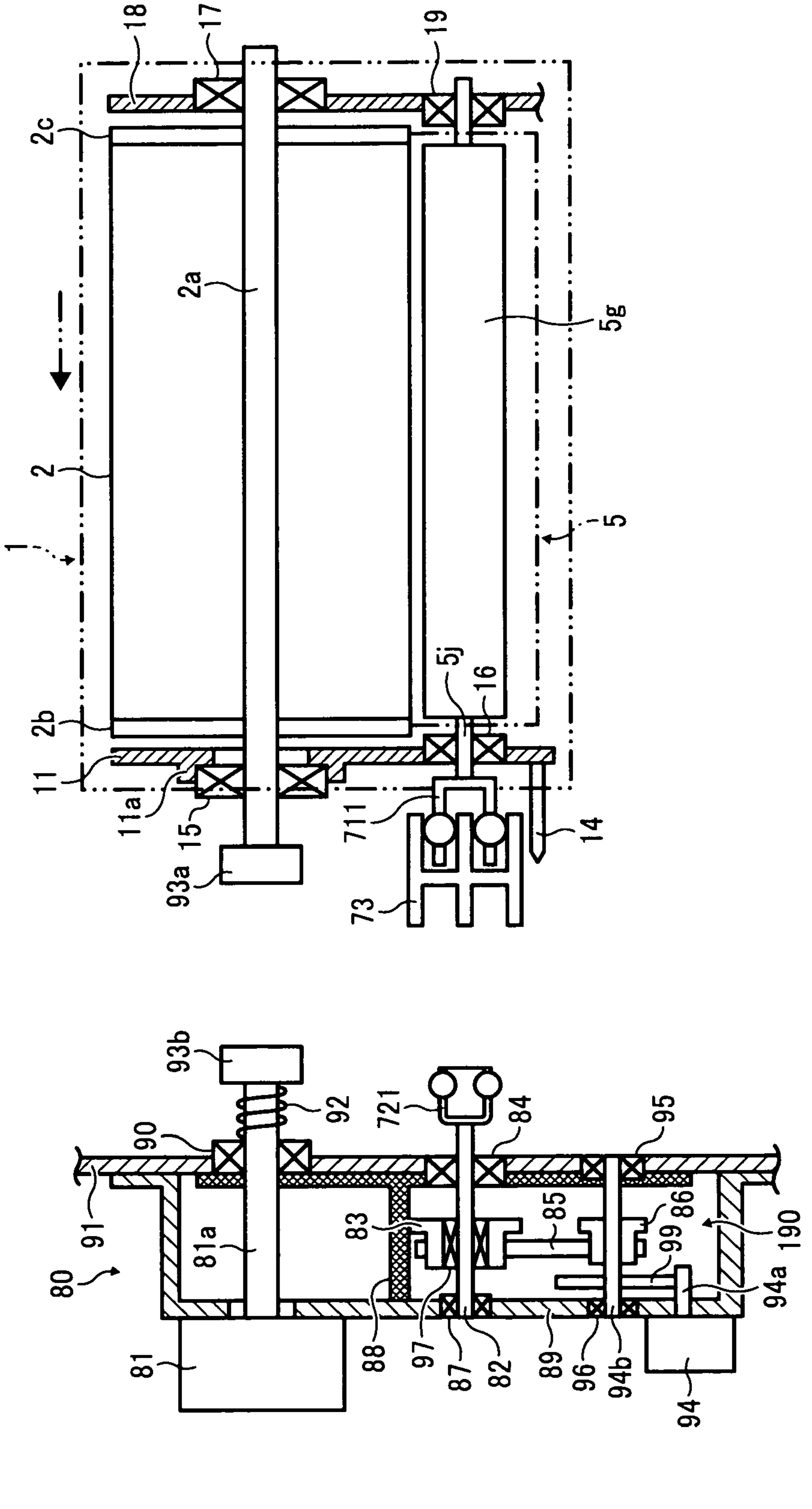
FIG. 5 is a schematic of a state before the process cartridge is mounted on the printer body.

FIG. 3A is a front view of the process cartridge 1 seen from the far side of the image forming apparatus body, and FIG. 3B is a perspective view of the same. FIG. 4 is a schematic of the printer body with the process cartridge 1 attached thereto. FIG. 5 is a schematic of the printer body with the process cartridge 1 not attached thereto.

As shown in FIG. 4, a near side surface plate 18, and a far side surface plate 11 are provided outside each end in the longitudinal direction of the process cartridge 1. The surface plates 11, and 18 support a drum shaft 2*a* as a support shaft of the photoconductor 2, and a developing roller shaft 5*j* of the developing roller 5*g* of the developing unit 5 rotatably, and maintain a constant development gap between the photoconductor 2 and the developing roller 5*g*. In other words, the drum shaft 2*a* of the photoconductor 2 mates rotatably with each of the surface plates 11, 18 through shaft bearings 15, 17. The developing roller shaft 5*j* of the developing roller 5*g* also mates rotatably with each of the surface plates 11, 18 through shaft bearings 16, 19. Thereby, the developing unit 5 as a driven unit, and the photoconductor 2 are assembled integrally.

As shown in FIGS. 3A and 3B, a long subordinate reference hole 13 is formed on the far side surface plate 11, and a subordinate reference pin 5*m* fixed to the developing unit 5 mates with the subordinate reference hole 13. Similarly, a long subordinate reference hole is formed on the near side surface plate 18, and a subordinate reference pin fixed to the developing unit 5 mates with the subordinate reference hole. In this way, with the subordinate reference pins mating with the subordinate reference holes formed on the surface plates 11, 18, the developing unit 5 is prevented from rotating about the central shaft line of the developing roller 5*g*.

As described above, the photoconductor 2 and the developing roller 5*g* are correctly positioned to each other and coupled with each other, and the integral process cartridge 1 is configured. Furthermore, each of the surface plates 11, 18 correctly regulates the distance between the central shaft line of the photoconductor 2 and the central shaft line of the developing roller 5*g*. Thereby, when the photoconductor 2 and the developing roller 5*g* are arranged opposite to each other with a minute gap therebetween as shown in FIG. 2, the gap is correctly maintained, and a toner image of high quality can be developed on the photoconductor 2. When the photoconductor 2 and the developing roller 5*g* are arranged opposite to each other while abutting on each other, the abutment pressure is correctly regulated, and a toner image of high quality can be developed on the photoconductor 2.

As shown in FIG. 5, a cartridge subordinate reference pin 14 as a cartridge side subordinate reference mating unit is formed on the far side surface plate 11. A driven coupling 93*a* is fixed to the far side end of the drum shaft 2*a*.

Figure 6:
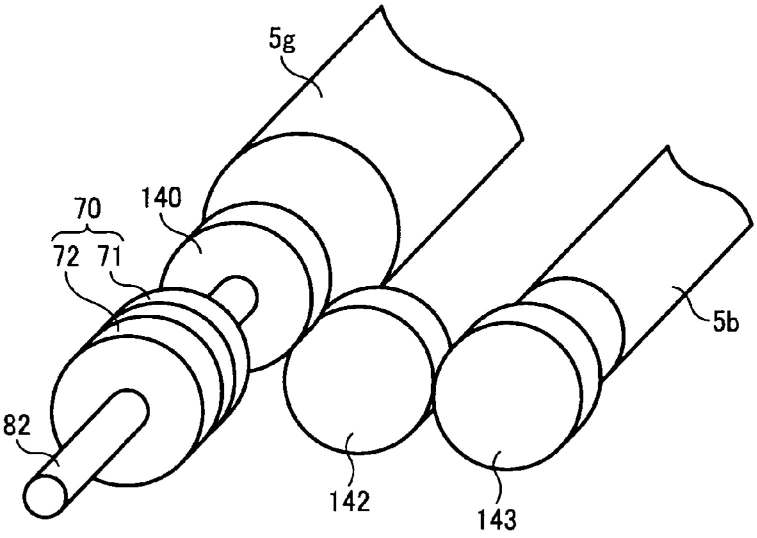
FIG. 6 is a perspective view of main parts of a drive transmission unit of a developing unit.

FIG. 6 is a perspective view of main parts of a drive transmission unit as a unit transmission mechanism of the developing unit 5.

As shown in FIG. 6, a first gear 140 is attached to the shaft of the developing roller 5*g*, and an idler gear 142 attached to the rotation shaft supported rotatably by a frame (not shown) meshes the first gear 140. A second gear 143 attached to the shaft of the second conveying screw 5*b* meshes the idler gear 142. Because the developing roller 5*g* as a rotating body has the largest torque among the rollers of the developing unit 5, a coupling unit 70 is preferably attached to the shaft of the developing roller 5*g*. This brings the following advantage. When the coupling unit 70 is attached to the conveying screw shaft, torque of the developing roller is applied to the unit transmission mechanism of the first gear 140, the idler gear 142, the second gear 143, and the like. On the other hand, when the coupling unit 70 is attached to the developing roller shaft, torque of the conveying screw is applied to the unit transmission mechanism. Because the developing roller has larger torque than that of the conveying screw, load on the unit transmission mechanism becomes smaller when the torque of the conveying screw is applied to the unit transmission mechanism as compared with when the torque of the developing roller is applied to the unit transmission mechanism. As a result, load on the unit transmission mechanism becomes smaller when the coupling unit 70 is attached to the developing roller shaft as compared with when the coupling unit 70 is attached to the conveying screw shaft, and accordingly the service life of the unit transmission mechanism can be extended.

As shown in FIGS. 4, and 5, a drive device 80 is fixed to a body side plate 91 opposite to the far side surface plate 11 of the process cartridge 1 provided to the printer body. The drive device 80 includes a retaining plate 89, a photoconductor drive motor 81 as a photoconductor drive source, a development drive motor 94 as a developing unit drive source, a drive transmission mechanism 190 as a drive transmission mechanism, and the coupling unit 70.

The retaining plate 89 is attached to the body side plate 91 by screw or the like. The photoconductor drive motor 81 and the development drive motor 94 are attached to the retaining plate 89. A motor shaft 81*a* of the photoconductor drive motor 81 mates rotatably with the body side plate 91 through a shaft bearing 90, and penetrates the body side plate 91. A drive side coupling 93*b* is attached to the tip of the motor shaft 81*a* movably in the shaft direction, and is biased to the process cartridge side by a coil spring 92 wound around the motor shaft 81*a*. The drive side coupling 93*b* is properly prevented from falling off by a pin or the like (not shown) provided to the motor shaft 81*a*.

The drive source that drives the photoconductor and the drive source that drives the developing roller are provided separately, and drive force of the photoconductor drive motor 81 as a drive source that drives the photoconductor is used only for the photoconductor. With this configuration, the photoconductor drive motor is not subjected to load fluctuation from other driving elements, and can rotation-drive the photoconductor 2 highly precisely. Needless to say, a single drive source may drive both the developing roller and the photoconductor.

The drive transmission mechanism 190 includes a first pulley 86, a drive shaft 82, a second pulley 83, a timing belt 85, an electromagnetic clutch 97, a driven shaft 94*b*, and a driven gear 99.

The driven shaft 94*b* mates rotatably with the retaining plate 89 through a shaft bearing 96, and mates rotatably with the body side plate 91 and an auxiliary support member 88 through a shaft bearing 95; thereby, the driven shaft 94*b* is supported by the body side plate 91 and the retaining plate 89. The drive shaft 82 is supported by the body side plate 91 and the retaining plate 89. Specifically, the drive shaft 82 mates rotatably with the retaining plate 89 through a shaft bearing 87, and mates rotatably with the body side plate 91 and the auxiliary support member 88 through a shaft bearing 84; thereby, the drive shaft 82 is supported by the body side plate 91 and the retaining plate 89. The auxiliary support member 88 is attached to the retaining plate 89 by screw or the like.

The first pulley 86 and the driven gear 99 are fixed to the driven shaft 94*b*, and the driven gear 99 meshes the motive gear fixed to a motor shaft 94*a* of the development drive motor 94.

The second pulley 83 is fixed to the drive shaft 82 through the electromagnetic clutch 97, and the timing belt 85 is wrapped around the second pulley 83 and the first pulley 86.

To transmit drive force of the development drive motor 94 to the developing roller 5*g*, the second conveying screw 5*b*, and the like, the electromagnetic clutch 97 is turned on, and the drive shaft 82 and the second pulley 83 are coupled. On the other hand, to couple the drive shaft 82 and the developing roller shaft 5*j* with the coupling unit 70 composed of two pairs of constant velocity joints 71, 72, the electromagnetic clutch 97 is turned off, and the drive shaft 82 is kept freely rotatable relative to the second pulley 83. Instead of the electromagnetic clutch 97, a one-way clutch that couples the drive shaft 82 and the second pulley 83 for rotation at the time of drive, and cancels the coupling of the drive shaft 82 and the second pulley 83 for rotation in a direction opposite to that at the time of drive may be used.

The drive shaft 82 and the developing roller shaft 5*j* as a driven shaft are coupled by the coupling unit 70 including two pairs of constant velocity joints.

Figure 7:
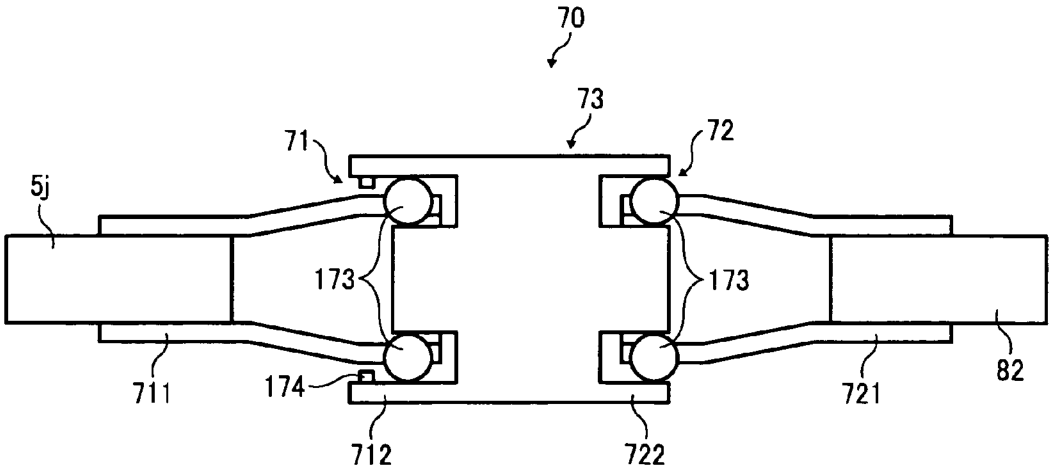
FIG. 7 is a schematic of a coupling unit.

FIG. 7 is a schematic of the coupling unit 70.

As shown in FIG. 7, the coupling unit 70 is configured with a first male joint 711 as a ball retaining member, a second male joint 721 as a ball retaining member, and a relay member 73. The first male joint 711 is attached to the far side end of the developing roller shaft 5*j*, and the second male joint 721 is attached to the process cartridge side end of the drive shaft 82. A first female joint unit 712 as a ball non-retaining member including an annular space that opens toward the developing roller shaft side end is formed at the developing roller shaft side end of the relay member 73. A second female joint unit 722 as a ball non-retaining member including an annular space that opens toward the drive shaft side end is formed at the drive shaft side end.

An annular space 712*d* of the first female joint unit 712 includes one open end in the shaft line direction, and the other closed end, and the first male joint 711 is inserted from the open end. In other words, in the present embodiment, the first female joint unit 712 of the relay member 73, and the first male joint 711 form the first constant velocity joint 71. An annular space 722*d* of the second female joint unit 722 has one open end in the shaft line direction and the other closed end, and the second male joint 721 is inserted from the open end. In other words, in the present embodiment, the second female joint unit 722 of the relay member 73, and the second male joint 721 form the second constant velocity joint 72.

In the present embodiment, the first female joint that configures the first constant velocity joint 71, and the second female joint that configures the second constant velocity joint 72 are formed integrally (a relay member) with a same material (for example, a resin material). As a result, the number of parts can be reduced as compared with one in which the first female joint and the second female joint are provided separately.

The constant velocity joint will be explained with reference to FIGS. 8 to 10. The first constant velocity joint 71 and the second constant velocity joint 72 have a same configuration, so that the first constant velocity joint 71 will be explained below as an example. The symbols in parentheses in FIGS. 8 to 10 are symbols of units of the second constant velocity joint 72.

Figure 8:
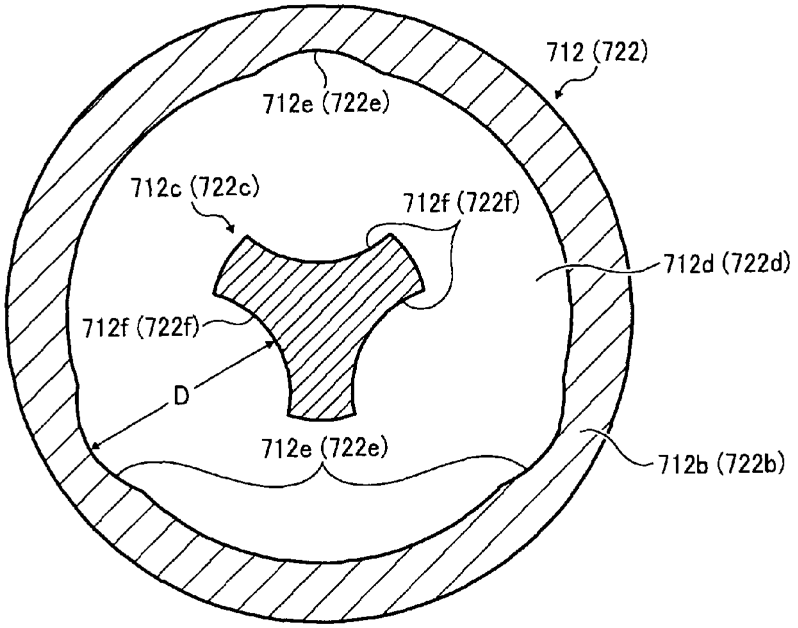
FIG. 8 is a cross-section diagram of a first female joint.

FIG. 8 is a cross-section diagram of the first female joint unit 712 of the relay member 73. The first female joint unit 712 includes a cylindrical cup part that opens toward the side of the developing roller shaft 5*j*, from which the first male joint 711 is inserted. The cup part includes an outer ring part 712*b*, an inner ring part 712*c* inside the outer ring part 712*b*, the annular space 712*d* formed as a gap between the outer ring part 712*b* and the inner ring part 712*c*, three outer grooves 712*e* as track grooves provided on the inner circumference surface of the outer ring part 712*b*, and three inner grooves 712*f* as track grooves provided on the outer circumference surface of the inner ring part 712*c*.

The outer grooves 712*e* provided on the inner circumference surface of the outer ring part 712*b* extend in the shaft line direction of the outer ring part 712*b*, and align in the circumferential direction with a phase difference of 120 degrees therebetween. The inner grooves 712*f* provided on the outer circumference surface of the inner ring part 712*c* also extend in the shaft line direction of the inner ring part 712*c*, and align in the circumferential direction with a phase difference of 120 degrees therebetween. The inner groove 712*f* and the outer groove 712*e* face each other with the annular space 712*d* therebetween.

Figure 9:
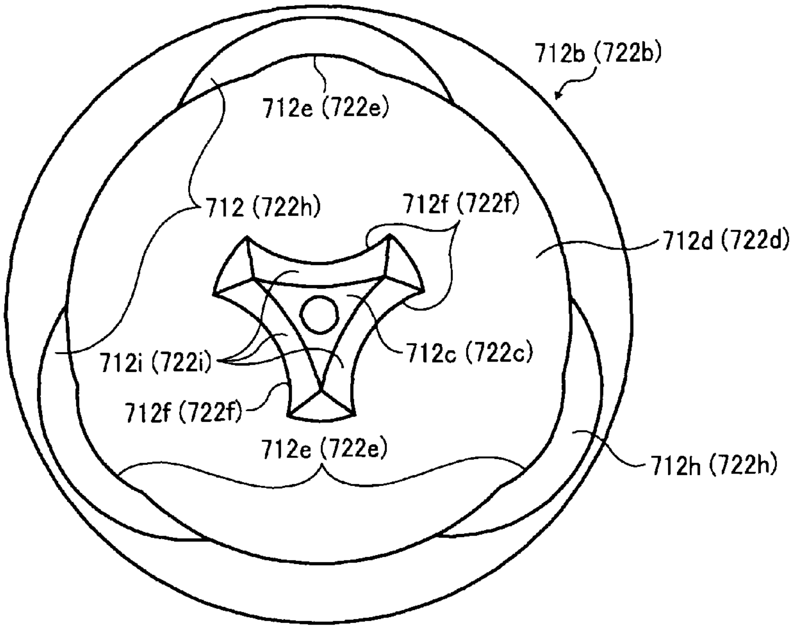
FIG. 9 is a schematic of the first female joint seen in the shaft direction.
Figure 10:
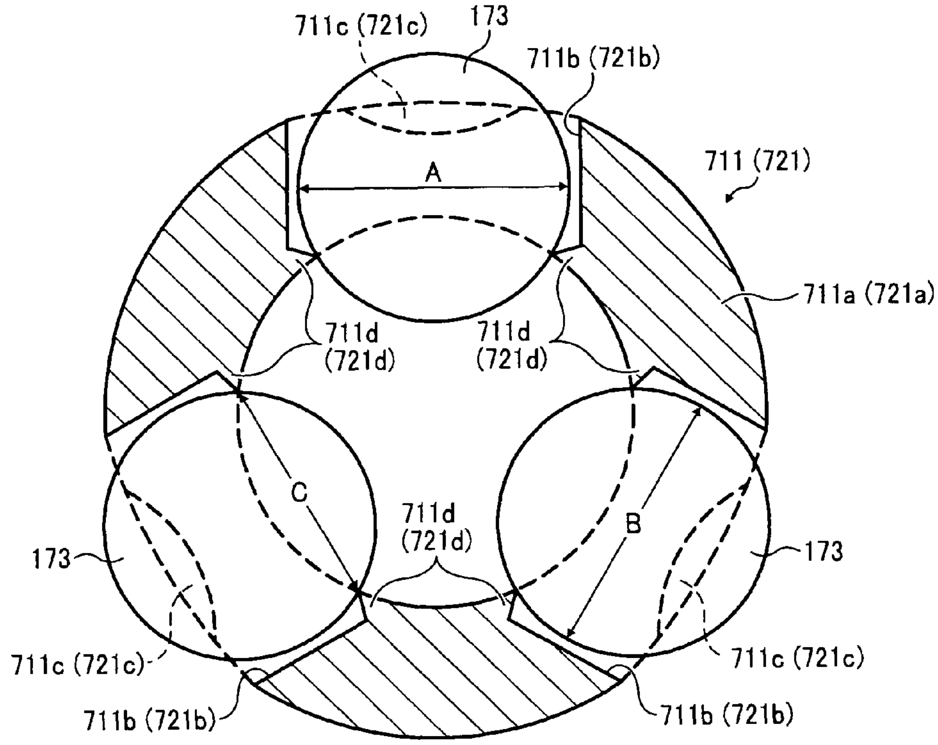
FIG. 10 is a cross-section diagram of a first male joint.

As shown in FIG. 9, taper-shaped outer groove guiding parts 712*h* that are more apart from the shaft center and have larger groove width as they are closer to the opening end are provided on the opening end side of the outer groove 712*e*. Taper-shaped outer groove guiding parts 712*i* that are closer to the shaft center and have larger groove width as they are closer to the opening end are provided on the opening end side of the inner groove 712*f*. By providing the inner groove guiding parts 712*h*, 712*i* in this way, balls 173 can be guided to the annular space 712*d* where the inner groove 712*f* and the outer groove 712*e* face with each other, and the first male joint 711 can be easily inserted into the first female joint unit 712.

The edges of the inner groove guiding parts 712*i* meet at the opening end of the cup part. With this configuration, even if the phase of the track groove (the outer groove 712*e* and the inner groove 712*f*) and the ball 173 is about 60 degrees when the male joint and the female joint are assembled, the ball 173 can contact the opening end of the inner groove guiding parts 712*i*. Thereby, even if the phase of the track groove (the outer groove 712*e* and the inner groove 712*f*) and the ball 173 is about 60 degrees, a part of the force in the shaft direction applied to the inner ring part 712*c* can be converted to the force in the rotational direction by the inner groove guiding part 712*i*, and the male joint can be rotated relatively smoothly relative to the female joint. Accordingly, the insertion resistance at the time of inserting the ball 173 retained by the male joint to the annular space 712*d* between the outer groove 712*e* and the inner groove 712*f* of the female joint can be reduced, and the ball 173 can be smoothly inserted into the annular space 712*d* between the outer groove 712*e* and the inner groove 712*f* of the female joint.

FIG. 10 is a cross-section diagram of the first male joint 711. The cross-section diagram of the second male joint 721 has the same configuration, and symbols of the units of the second male joint 721 are shown in parentheses.

The first male joint 711 includes a cylindrical insertion part 711*a* at its tip side. The cylindrical insertion part 711*a* includes three through holes 711*b* provided on the cylindrical circumferential wall and aligning in the circumferential direction with a phase difference of 120 degrees therebetween, and retains the ball 173 as a sphere rotatably in each of the through holes 711*b*.

The diameter A of the through hole 711*b* is larger than the diameter B of the ball 173. Inner circumference retaining projections 711*d* protruding from the inner circumference side ends of the inner surfaces of the through holes 711*b* are provided with a phase difference of 180 degrees therebetween. Outer circumference retaining projections 711*c* protruding from the outer circumference ends of the inner surfaces of the through holes 711*b* are provided with a phase difference of 180 degrees. The outer circumference retaining projections 711*c* and the inner circumference retaining projection 711*d* are provided with a phase difference of 90 degrees therebetween. The ball 173 in the through hole 711*b* never falls off from the outer circumference surface of the cylindrical insertion part 711*a* due to the outer circumference retaining projection 711*c*. The ball 173 in the through hole 711*b* never falls off from the inner circumference surface of the cylindrical insertion part 711*a* due to the inner circumference retaining projection 711*d*. The diameter C of the inscribed circle of the retaining projections 711*c*, 711*d* is set within the range of 80% to 99% of the diameter B of the ball 173. If the diameter C is less than 80%, the retaining projections 711*c*, 711*d* protrude excessively from the through hole 711*b*, and the ball 173 cannot be inserted into the through hole 711*b*. Although the retaining projections 711*c*, 711*d* are molded by easy extraction of a mold, the retaining projections 711*c*, 711*d* may corrupt at the time of stripping after injection molding when the retaining projections 711*c*, 711*d* protrude excessively. Therefore, the diameter C of the inscribed circle of the retaining projections 711*c*, 711*d* is preferably set equal to or larger than 80% of the diameter B of the ball 173.

By setting the diameter A of the through hole 711*b* larger than the diameter B of the ball 173, the ball 173 can move in the through hole 711*b* in the radial direction. Thereby, when the cylindrical insertion part 711*a* of the first male joint 711 is inserted into the annular space 712*d* of the first female joint unit 712, the ball 173 hits the outer ring part 712*b* of the first female joint unit 712, and then moves toward the shaft center. Thereby, the cylindrical insertion part 711*a* of the first male joint 711 can be smoothly inserted in the annular space 712*d* of the first female joint unit 712.

The tolerance of a distance D from the outer groove 712*e* to the inner groove 712*f* is set to be larger than the diameter B of the ball 173. If the distance D from the outer groove 712*e* to the inner groove 712*f* is set equal to the diameter B of the ball 173, the distance D from the outer groove 712*e* to the inner groove 712*f* may be smaller than the diameter B of the ball 173 due to manufacturing error or the like. In particular, because the female joint is injection-molded with a resin in the present embodiment, the degree of a sink mark and the like can vary depending on manufacturing conditions such as temperature and humidity, and the possibility of the distance D from the outer groove 712*e* to the inner groove 712*f* being smaller than the diameter B of the ball 173 is high. If the distance D from the outer groove 712*e* to the inner groove 712*f* is smaller than the diameter B of the ball 173, the sliding resistance of the ball 173 to the outer groove 712*e*, and the inner groove 712*f* becomes large. As a result, the outer groove 712*e*, and the inner groove 712*f* wear in a short period of time, and the service life of the first female joint unit 712 becomes short. If the distance D from the outer groove 712*e* to the inner groove 712*f* becomes smaller than the diameter B of the ball 173, the ball 173 is lightly press-fitted between the grooves, and cannot move in the grooves smoothly, and the developing roller 5*g* may not rotate at a constant velocity. Furthermore, a so-called creep phenomenon occurs in which a constant load is kept applied on the inner grooves 712*f* and the outer groove 712*e* for a long period of time, causing large deformation, and the service life of the female joint 712 becomes short.

However, the tolerance of the distance D from the outer groove 712*e* to the inner groove 712*f* is set larger than the diameter B of the ball 173 in the present embodiment, voids are formed between the ball 173 and the outer groove 712*e*, and the ball 173 and the inner groove 712*f*. Thereby, the ball 173 can be prevented from being lightly press-fitted between the grooves, and the sliding resistance of the ball 173 to the outer groove 712*e* and the inner groove 712*f* can be surely prevented from increasing. Therefore, wear of the outer groove 712*e* and the inner groove 712*f*, and the creep phenomenon can be suppressed, and the service life of the first female joint unit 712 can be made longer. Because the ball 173 can move in the grooves smoothly, the developing roller 5*g* can surely rotate at a constant velocity.

The cylindrical insertion part 711*a* of the first male joint 711 is inserted into the annular space 712*d* in the outer ring part 712*b* of the first female joint unit 712. In this state, each of the three balls 173 retained in the cylindrical insertion part 711*a* of the first male joint 711 is sandwiched between the outer groove 712*e* provided on the inner circumference surface of the outer ring part 712*b* of the female joint unit 712, and the inner groove 712*f* provided on the outer circumference surface of the inner ring part 712*c*, and is inhibited from moving in the normal direction. Meanwhile, because the inner groove 712*f*, and the outer groove 712*e* extend in the shaft line direction, the ball 173 is allowed to move in the shaft line direction.

The second male joint 721 has the same configuration as that of the first male joint 711, and the second female joint unit 722 of the relay member 73 has the same configuration as that of the first female joint unit 712 of the relay member 73. By making the configurations of the second male joint 721 and the first male joint 711 the same, parts can be made common, and the management cost of the parts can be lowered.

By making the configurations of the second female joint unit 722 of the relay member 73 and the first female joint unit 712 the same, the first female joint unit that engages with the first male joint can be any of the female joint unit formed at both the ends of the relay member 73. Thereby, the relay member 73 can be assembled easily.

After the cylindrical insertion part 711*a* of the first male joint 711 is inserted into the annular space of the first female joint unit 712, and the ball 173 is engaged with the inner groove and the outer groove, a retaining ring 174 is mated with the opening end of the first female joint unit 712 as shown in FIG. 7, and the first male joint 711 is prevented from being detached from the first female joint.

By mating the retaining ring 174 as the retaining mechanism, and preventing the first male joint 711 from being detached from the first female joint in this way, it becomes possible to prevent the first male joint 711 from being detached from the first female joint and to prevent the relay member from coming off into the apparatus body at the time of detaching the process cartridge 1. Accordingly, as shown in FIG. 5, the first male joint 711 and the relay member 73 are detached integrally with the process cartridge 1. In other words, in the present embodiment, the second constant velocity joint 72 interlocks with attachment/detachment of the process cartridge 1, and the second female joint unit 722 as the ball non-retaining member and the second male joint 721 as the ball retaining member are engaged with and separated from each other.

The cylindrical insertion part 711*a* of the first male joint 711 is inserted into the annular space 712*d* of the first female joint unit 712, and engages the three balls 173 that the first male joint 711 retains with the inner groove 712*f* and the outer groove 712*e* in the annular space 712*d*. A cylindrical insertion part 721*a* of the second male joint 721 is inserted into the annular space 722*d* of the second female joint unit 722, and engages the three balls that the second male joint 721 retains with an inner groove 722*f* and an outer groove 722*e* in the annular space 722*d*. Then, the motor shaft 94*a* of the development drive motor 94 rotates, and the first pulley 86 fixed to the motor shaft rotates accordingly. The timing belt 85 transmits the drive force of the first pulley 86 to the second pulley 83 to rotate the drive shaft 82. Thereby, the rotation drive force is transmitted at a constant velocity to the relay member 73 through the three balls 173 that the second male joint 721 retains. The rotation drive force of the relay member is transmitted at a constant velocity to the first male joint 711 through the three balls 173 that the first male joint 711 retains. Thereby, the developing roller shaft 5*j*, and the developing roller 5*g* rotate at a constant velocity.

Although an example in which the track grooves for engaging the ball 173 with both of the inner circumference surface of the outer ring part 712*b* (722*b*), and the outer circumference surface of the inner ring part 712*c* (722*c*) of the female joint 712 (722) are provided is explained, the track groove may be provided to either one of them.

The relay member 73, and the first and second male joints 711, 721 including the first and second female joint units 712, 722 are preferably made of molded article of a synthetic resin that can be injection-molded. Any thermoplastic resin or a thermoset resin that can be injection-molded can be used. A synthetic resin that can be injection-molded include a crystalline resin, and a non-crystalline resin. Although either of them may be used, a crystalline resin is preferably used because a non-crystalline resin has low toughness, and is rapidly destroyed when a torque equal to or larger than an allowance is applied thereto. A resin having relatively high lubrication characteristic is preferable. Examples of the synthetic resin include polyacetal (POM), nylon, injection-moldable fluororesin (for example PFA, FEP, ETFE), injection-moldable polyimide, polyphenylene sulfide (PPS), wholly aromatic polyester, polyether ether ketone (PEEK), and polyamide-imide. Any of these synthetic resins may be used singly, or polymer-alloy obtained by mixing equal to or more than two of the synthetic resins may be used. Even other synthetic resins having relatively low lubrication characteristic may be used if compounded with the synthetic resin to form polymer alloy.

The most suitable synthetic resin is a synthetic resin having slidability, and is POM, nylon, PPS, and PEEK. Examples of nylon include nylon 6, nylon 66, nylon 610, nylon 612, nylon 11, nylon 12, nylon 46, and semiaromatic nylon having an aromatic ring in a molecular chain. Among them, POM, nylon, and PPS can realize a constant velocity joint excellent in cost performance because they have excellent heat resistance, and slidability, and are relatively inexpensive. PEEK can realize high performance constant velocity joint because it has excellent mechanical strength and slidability without being compounded with a reinforcing member or a lubricant.

By forming the relay member 73 and the first and second male joints 711, 721 with a resin material, the coupling unit 70 can be made lighter as compared with that of a configuration in which the relay member 73, and the first and second male joints 711, 721 are formed with metal. By forming the first and second female joint units 712, 722 and the first and second male joints 711, 721 of the relay member with a resin having slidability, the ball 173 can slide smoothly along the track grooves (the inner groove, and the outer groove) of the female joints 712, 722 without filling the annular space with grease. Thereby, operation sound can be made smaller as compared with that of a configuration in which they are formed with a metal material. By forming the ball 173 with a resin having slidability, the ball 173 can slide smoothly along the track grooves. Of course, all of the ball 173, the relay member 73, and the first and second male joints 711, 721 may be formed with a resin having slidability.

How the process cartridge 1 can be attached to the apparatus body will be explained below.

In the printer of the present embodiment, the process cartridge 1 is attached to the apparatus body with the drum shaft 2*a* of the photoconductor 2 used as a master reference, and the cartridge subordinate reference pin 14 as the cartridge subordinate reference mating unit used as a subordinate reference. When attaching the process cartridge 1 to the apparatus body, the electromagnetic clutch 97 is turned off, and the drive shaft 82 is left freely rotatable relative to the second pulley 83.

As shown in FIGS. 4, and 5, when the process cartridge 1 is attached to the image forming apparatus body, the driven coupling 93*a* as the positioned part attached to the drum shaft 2*a* mates with the drive side coupling 93*b* as the positioning part attached to the motor shaft 81*a* positioned in the apparatus body, and the process cartridge 1 is thereby positioned relative to the apparatus body in the radial direction. The cartridge subordinate reference pin 14 as the cartridge subordinate reference mating unit projecting from the far side surface plate 11 mates with a positioning hole 98 formed in the body side plate 91. Thereby, the process cartridge 1 is inhibited from rotating about the central shaft line of the photoconductor 2, and the entire body of the process cartridge 1 is positioned correctly to the apparatus body.

Figure 11:
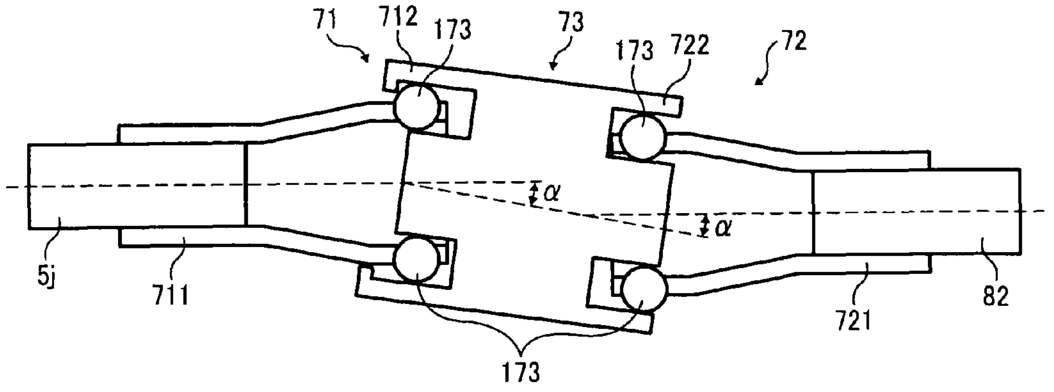
FIG. 11 is a schematic of the coupling unit when a developing roller shaft and a drive shaft are coupled with each other while the shaft center of a developing roller shaft, and the shaft center of a drive shaft misalign with each other.

Even if the entire body of the process cartridge 1 is positioned correctly to the apparatus body, the shaft center of the developing roller shaft 5*j* and the shaft center of the drive shaft 82 may misalign with each other in the radial direction due to accumulation of tolerance. In such a case, the ball 173 retained by a through hole 721*b* of the second male joint 721 hits an outer groove guiding part 722*h* of the second female joint unit 722 or the inner groove guiding part 712*i* of the relay member 73. Furthermore, when the process cartridge 1 is inserted into the apparatus body, the relay member 73 inclines, and the cylindrical insertion part 721*a* of the second male joint 721 is introduced into the annular space 722*d* of the second female joint unit 722 as shown in FIG. 11.

When the cylindrical insertion part 721*a* of the second male joint 721 is inserted into the annular space 722*d* of the second female joint unit 722, if the phase of the ball 173 and the phase of the track grooves (the outer groove 722*e* and the inner groove 722*f*) are different, the ball 173 is guided to the outer groove guiding part 722*h* and an inner groove guiding part 722*i*, and rotates interlocking with movement of the process cartridge 1 in the insertion direction; thereby, the phase of the ball 173 and the phase of the track grooves (the outer groove 722*e* and the inner groove 722*f*) are matched. At this time, because the electromagnetic clutch 97 is turned off, and the drive shaft 82 is kept freely rotatable relative to the second pulley 83, the only rotational load applied on the second male joint 721 is the inertial force of the drive shaft 82. Accordingly, the second male joint 721 can be easily rotated, increase in the insertion resistance of the process cartridge 1 is suppressed, and the ball 173 can be guided to the track grooves (the outer groove 722*e* and the inner groove 722*f*).

When the phase of the ball 173 and the phase of the track grooves (the outer groove 722*e* and the inner groove 722*f*) match, and the cylindrical insertion part 721*a* of the second male joint 721 is inserted into the annular space of the second female joint unit 722, the three balls 173 that the second male joint 721 retains are engaged with the inner groove 722*f* and the outer groove 722*e* in the annular space 722*d*.

When the developing roller 5*g* or the second conveying screw 5*b* is to be rotation-driven, the electromagnetic clutch is turned on, and the second pulley 83 and the drive shaft 82 are coupled with each other. When the development drive motor 94 is rotation-driven, the motor shaft 94*a* rotates, the first pulley 86 fixed to the motor shaft 94*a* rotates also, and drive force is transmitted to the second pulley 83 through the timing belt 85, and then is transmitted to the drive shaft 82. The drive force transmitted to the drive shaft 82 rotates the drive shaft 82, and is transmitted to the developing roller shaft 5*j* through the coupling unit 70.

In the present embodiment, as shown in FIG. 11, even when the shaft centers of the drive shaft 82 and the developing roller shaft 5*j* misalign, the relay member 73 inclines, the cylindrical insertion part 721*a* of the second male joint 721 can thereby be inserted into the annular space of the second female joint unit 722, and the drive shaft 82 and the developing roller shaft 5*j* can be coupled with each other. As shown in FIG. 11, a deviation $\alpha$ may be generated between the relay member 73 and the drive shaft 82, and between the relay member 73 and the developing roller shaft 5*j*. Even if the deviation $\alpha$ is generated between the drive shaft 82 and the relay member 73, the rotation of the drive shaft can be transmitted at a constant velocity because the ball 173 retained by the second male joint 721 of the second constant velocity joint 72 slides in the annular space between the inner groove 722*f* and the outer groove 722*e* of the second female joint unit 722 in the shaft direction.

Even if the deviation $\alpha$ is generated between the relay member 73 and the developing roller shaft 5*j*, the rotation can be transmitted at a constant velocity because the ball 173 retained by the first male joint 711 of the first constant velocity joint 71 slides in the annular space between the inner groove 712*f* and the outer groove 712*e* of the first female joint unit 712 in the shaft direction.

In this way, even if the deviation $\alpha$ is generated between the relay member 73 and the drive shaft 82, and between the relay member 73 and the developing roller shaft 5*j*, the rotation of the drive shaft can be transmitted at a constant velocity to the developing roller shaft 5*j* by the first constant velocity joint 71 and the second constant velocity joint 72. Thereby, even without enhancing attachment accuracy or part accuracy to avoid misalignment between the shaft centers of the drive shaft 82 and the developing roller shaft 5*j*, the developing roller 5*g* can be rotation-driven at a constant velocity, and formation of abnormal images having concentration irregularity or the like can be suppressed. Accordingly, while manufacturing cost, and part cost are lowered, formation of abnormal images having concentration irregularity or the like can be suppressed.

To remove the process cartridge 1 from the printer body, a front door (not shown) is opened, and the process cartridge 1 is drawn to the near side. At this time, the second male joint 721 of the second constant velocity joint 72, and the second female joint unit of the second male joint 721 of the coupling unit 70 are separated, the first constant velocity joint 71 and the second female joint unit (the first male joint 711 and the relay member) are taken out of the printer body together with the process cartridge 1. In this way, in the present embodiment, the second constant velocity joint 72 is engaged and separated by attachment and detachment of the process cartridge 1, thereby coupling the drive shaft and the developing roller shaft. Thereby, as compared with a structure in which a member for coupling the drive shaft and the developing roller shaft is provided in addition to two pairs of constant velocity joints, the number of parts can be reduced, and the cost of the apparatus can be lowered.

By taking the surface plates 11, 18 out of the photoconductor 2 and the developing unit 5 after the process cartridge 1 is taken out of the printer body, the photoconductor 2 and the developing unit 5 are separated from each other.

A guide groove (not shown) is formed in the process cartridge 1, and a guide rail (not shown) is provided in the apparatus body. When the process cartridge 1 is drawn to the near side, or pushed in to the far side, the guide groove mates with the guide rail, and slides along the guide rail.

The first male joint 711 and the first female joint may be engaged and separated interlocking with attachment and detachment of the process cartridge 1. However, it is preferable that the second male joint 721 and the second female joint are engaged and separated interlocking with attachment and detachment of the process cartridge 1, and the relay member including the first female joint unit 712 and the second female joint unit are attached and separated to/from the apparatus body together with the process cartridge 1.

Because the first and second female joint units 712, 722 slide more with the ball 173 as compared with the first and second male joints 711, 721, the first and second female joint units 712, 722 wear faster than the first and second male joints 711, 721, and the service life becomes short. For this reason, the relay member is most frequently replaced of all the members of the coupling unit. When the first male joint 711 and the first female joint are engaged and separated interlocking with attachment and detachment of the process cartridge 1, the relay member stays in the apparatus body; therefore, a new relay member is attached in the apparatus body by detaching the relay member of the apparatus body, which worsens workability of replacement of the relay member.

On the other hand, when the relay member including the first female joint unit 712 and the second female joint unit 722 can be attached and detached to/from the apparatus body together with the process cartridge 1, the relay member 73 can be replaced by taking the process cartridge 1 out of the apparatus body, which enhances workability of replacement of the relay member 73. Accordingly, as compared with a structure in which the first male joint and the first female joint are engaged and separated interlocking with attachment and detachment of the process cartridge 1, and the relay member stays in the apparatus body, the relay member 73 can be replaced easily.

Although in the present embodiment the electromagnetic clutch 97 is provided in the drive transmission mechanism 190 of the drive device 80, the electromagnetic clutch may be provided in the drive transmission unit of the developing unit 5 shown in FIG. 6. In this case, the first gear 140 is attached to the developing roller shaft 5*j* through the electromagnetic clutch. When the second male joint 721 attached to the drive shaft 82 is inserted into the second female joint of the relay member 73, the electromagnetic clutch is turned off, and the first gear 140 is uncoupled from the developing roller shaft 5*j*. Thereby, at the time of coupling the drive shaft 82 and the developing roller shaft 5*j*, the torque of the second conveying screw 5*b* is not applied on the developing roller shaft, and the developing roller shaft can be rotated easily. Accordingly, when the phase of the ball 173 that the second male joint 721 retains misaligns with the phase of the track grooves of the second female joint unit 722, the second female joint unit 722 rotates easily, and the phases of the ball 173 and the track grooves align with each other. Accordingly, the ball 173 can be guided to the track grooves while increase in the insertion resistance of the process cartridge 1 is suppressed.

Figure 12A:
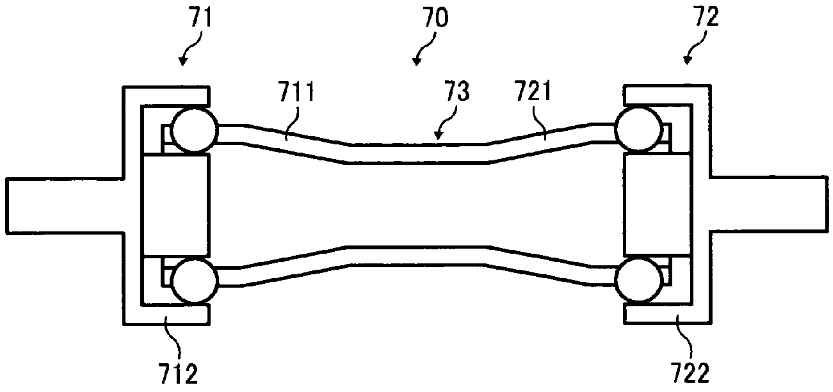
FIG. 12A is a schematic of the coupling unit including the first male joint and a second male joint as relay members.
Figure 12B:
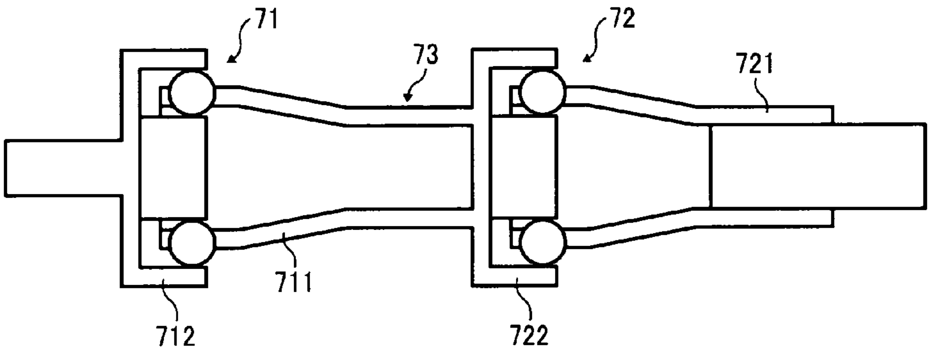
FIG. 12B is a schematic of the coupling unit including the first male joint and a second female joint as relay members.
Figure 12C:
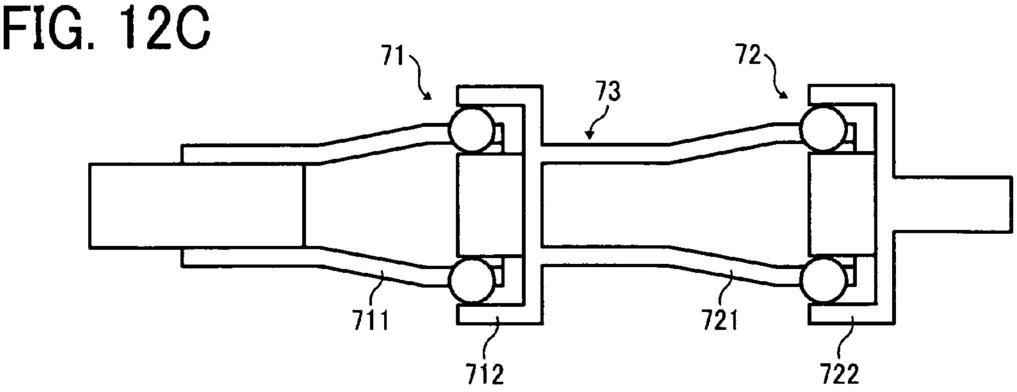
FIG. 12C is a schematic of the coupling unit including the first female joint and the second male joint as relay members.

It is assumed as shown in FIG. 12A that in the coupling unit 70 a member attached to the drive shaft side tip of the developing roller shaft 5*j* is the first female joint unit 712 of the first constant velocity joint 71, and a member attached to the developing roller side end of the drive shaft 82 is the second female joint unit 722 of the second constant velocity joint 72. The relay member 73 may have a configuration in which the first male joint 711 and the second male joint 721 are formed integrally. It is assumed as shown in FIG. 12B that a member attached to the drive shaft side tip of the developing roller shaft 5*j* is the first female joint unit 712 of the first constant velocity joint 71, and a member attached to the developing roller side end of the drive shaft 82 is the second male joint 721 of the second constant velocity joint 72. The relay member 73 may have a configuration in which the first male joint 711 and the second female joint unit 722 are formed integrally. Furthermore, it is assumed as shown in FIG. 12C that a member attached to the drive shaft side tip of the developing roller shaft 5*j* is the first male joint 711 of the first constant velocity joint 71, and a member attached to the developing roller side end of the drive shaft 82 is the second female joint unit 722 of the second constant velocity joint 72. The relay member 73 may have a configuration in which the first female joint unit 712 and the second male joint 721 are formed integrally.

About the coupling unit 70, the relay member 73 preferably has a configuration in which the first female joint unit 712 and the second female joint unit 722 shown in FIG. 7 are formed integrally, and the first male joint 711 and the second male joint 721 shown in FIG. 12A are formed integrally. When the configuration of the first constant velocity joint 71 and the configuration of the second constant velocity joint 72 are made the same, members attached to the drive shaft 82 (the first and second male joints 711, 721 in FIG. 7, and the female joints 712, 722 in FIG. 12A) can be made common, and the management cost and the like can be lowered. Because the attachment direction of the relay member 73 needs not be taken into consideration, the relay member 73 can be attached easily.

Figure 13:
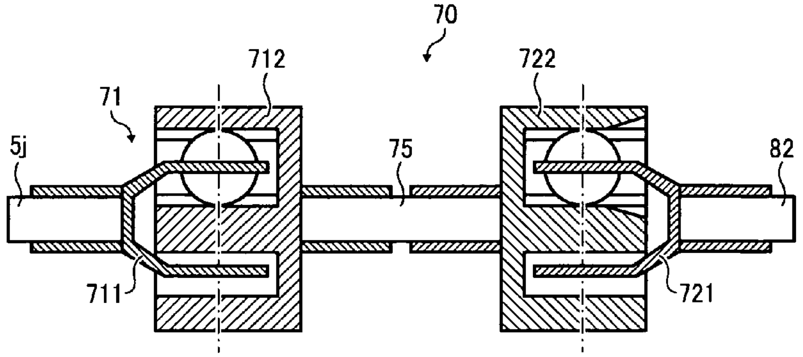
FIG. 13 is a schematic of the coupling unit that couples a first constant velocity joint and a second constant velocity joint with a coupling shaft.

As shown in FIG. 13, the drive shaft side member of the first constant velocity joint 71 (the first female joint unit 712 in FIG. 13) may be attached to the developing roller shaft side end of a coupling shaft 75, and the developing roller shaft side member of the second constant velocity joint 72 (the second female joint unit 722 in FIG. 13) may be attached to the drive side end of the coupling shaft 75. In this case, the drive shaft side member of the first constant velocity joint 71 (the first female joint unit 712 in FIG. 13), and the developing roller shaft side member of the second constant velocity joint (the second female joint unit 722 in FIG. 13) 72 may not be integrally.

Figure 14A:
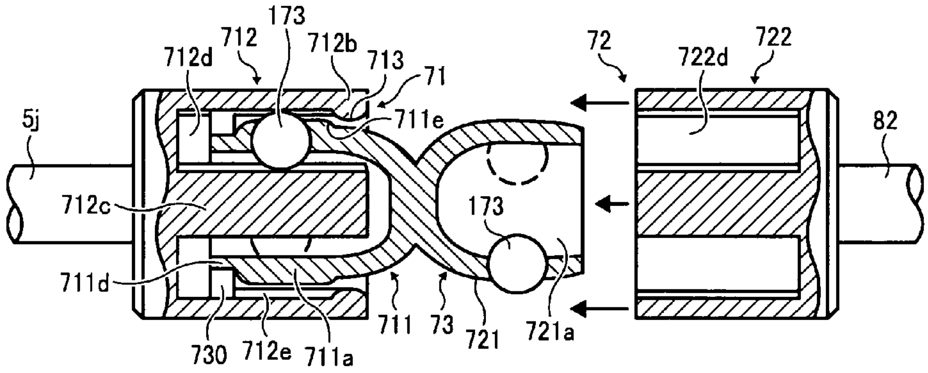
FIG. 14A is a schematic of the coupling unit having a configuration in which an elastic material is inserted between an outer circumference surface of an insertion part of the first male joint and an inner circumference surface of an outer ring of the first female joint.
Figure 14B:
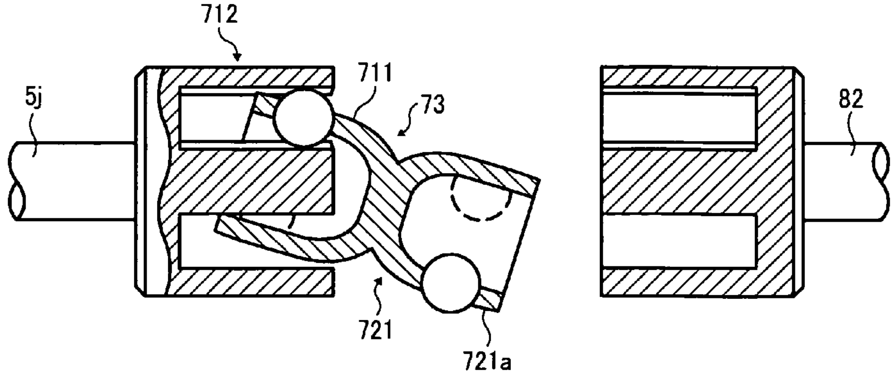
FIG. 14B is a schematic for explaining a problem of the coupling unit having a configuration in which an elastic material is not inserted between the outer circumference surface of an insertion part of the first male joint and the inner circumference surface of an outer ring of the first female joint.

As shown in FIG. 14B, when the process cartridge 1 is attached to the apparatus body, the relay member 73 may incline largely due to its own weight. Misalignment of the shaft centers of the drive shaft 82 and the developing roller shaft 5*j* is normally small. As shown in FIG. 14B, if the relay member 73 inclines largely due to its own weight when the process cartridge 1 is attached to the apparatus body, the second male joint 721 cannot be inserted into the second female joint unit 722.

To cope with this, as shown in FIG. 14A, a ring-shaped elastic material 730 such as rubber or sponge is inserted been the first male joint 711 of the first constant velocity joint 71 that is not engaged and separated interlocking with attachment and detachment of the process cartridge 1, and the inner circumference surface of the outer ring part 712*b* of the first female joint unit 712. In an example shown in FIG. 14A, the circumference retaining projection 711*d* is provided on the outer circumference surface at the tip of the first male joint 711, and the ring-shaped elastic material 730 is inserted between the circumference retaining projections 711*d*, and the inner circumference surface of the outer ring part 712*b* of the first female joint unit 712. The elastic material 730 may be attached to the notch of the first male joint 711, or may be attached to the inner circumference surface of the outer ring part 712*b* of the first female joint unit 712. The ring-shaped elastic material 730 may be inserted between the inner circumference surface at the tip of the first male joint 711, and the outer circumference surface of the inner ring part 712*c* of the first female joint. The elastic material 730 may be inserted between the opening end of the inner ring part 712*c* of the first female joint unit 712, and the inner circumference surface of the first male joint 711. The elastic material 730 may be inserted between the opening end of the outer ring part 712*b* of the first female joint unit 712, and the outer circumference surface of the first male joint 711.

The hardness of the elastic material 730 is lower than the hardness of the material forming the first female joint unit 712.

In this way, by inserting the elastic material 730 between the outer circumference surface of the cylindrical insertion part 711*a* of the first male joint 711, and the inner circumference surface of the outer ring part 712*b* of the first female joint unit 712, or between the inner circumference surface of the cylindrical insertion part 711*a* of the first male joint 711, and the outer circumference surface of the inner ring part 712*c* of the first female joint unit 712, the elastic force of the elastic material 730 suppresses the relay member 73 from inclining due to its own weight. As a result, when the second male joint 721 of the relay member 73 is inserted into the second female joint unit 722 attached to the drive shaft 82, it becomes possible to suppress the relay member 73 from inclining largely, and the cylindrical insertion part 721*a* of the second male joint 721 from being unable to be inserted into the annular space 722*d* of the second female joint unit 722.

The hardness of the elastic material 730 is lower than the hardness of the material forming the first female joint unit 712, and is sufficiently soft. Accordingly, when the cylindrical insertion part 721*a* of the second male joint 721 is inserted into the annular space 722*d* of the female joint 722 while the shaft center of the developing roller shaft 5*j* and the shaft center of the drive shaft 82 misalign in the radial direction, the relay member 73 inclines easily. As a result, the cylindrical insertion part 721*a* of the second male joint 721 can be introduced into the annular space 722*d* of the second female joint unit 722.

As shown in FIG. 14A, the retaining mechanism for preventing the first male joint 711 of the relay member 73 from coming off the first female joint unit 712 may be a retaining projection 713 that projects from the opening end of the outer ring part 712*b* of the first female joint unit 712. The retaining projection 713 may have a ring shape continuing in the circumferential direction. A plurality of the retaining projection 713 may be provided at a constant interval in the circumferential direction at, for example, the terminus of the opening side of the outer groove 712*e*. When the retaining projection 713 is provided at the opening side of the outer groove 712*e*, by the ball 173 that the first male joint 711 retains hitting the retaining projection 713, the first male joint 711 (the relay member 73) is suppressed from coming off the first female joint unit 712. The retaining projection 713 may be provided at the opening end of the inner ring part 712*c* of the first female joint unit 712.

In an example shown in FIG. 14A, the retaining projection 713 is provided at a portion other than the terminus of the opening side of the outer groove 712*e*. In this case, a step 711*e* is provided at the cylindrical insertion part 711*a* of the first male joint 711. When the first male joint 711 is about to come off the first female joint unit 712, the step 711*e* provided at the cylindrical insertion part 711*a* of the first male joint 711 hits the retaining projection 713, and prevents the first male joint 711 (the relay member 73) from coming off the first female joint unit 712.

When the retaining mechanism is the retaining projection 713, and is formed integrally with the first female joint unit 712, the outer ring part 712*b* is formed for example with a synthetic resin to make the tip elastically deformable. With this configuration, when the first male joint 711 is inserted into the first female joint unit 712, the cylindrical insertion part 711*a* of the first male joint 711 can be inserted into the annular space 712*d* of the first female joint unit 712 by so-called snap-fit in which the opening end of the outer ring part 712*b* elastically deforms in a direction of diameter expansion of the annular space, and the relay member 73 can thereby be assembled with the first female joint unit 712.

The elastic material 730 for preventing inclination of the retaining projection 713 and the relay member 73 due to their own weight can be applied to the relay member 73 having structures shown in FIGS. 7, 12B, and 12C as well as the relay member 73 configured with the first male joint 711 and the second male joint 721.

Figure 15:
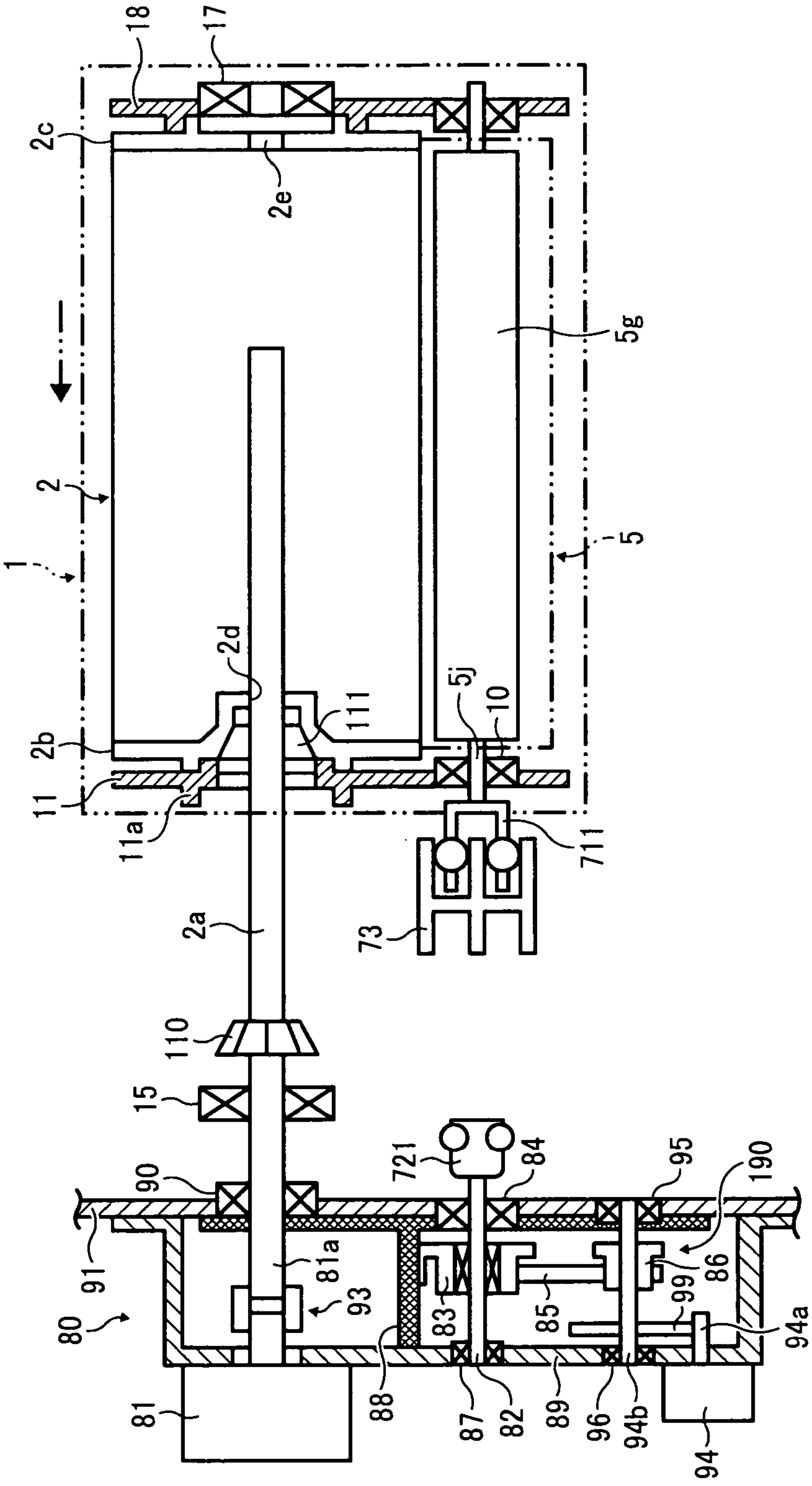
FIG. 15 is a schematic of a configuration of main parts of an image forming apparatus of a first modification of the present embodiment.

FIG. 15 is a schematic of an image forming apparatus according to a first modification of the embodiment. In the horizontal direction shown in FIG. 15, the left side corresponds to the far side of the image forming apparatus, and the right side corresponds to the near side of the image forming apparatus.

In the image forming apparatus of the first modification, the drum shaft 2*a* is fixed to the body side, and by inserting the drum shaft 2*a* to drum shaft holes 2*d*, 2*e* provided at the centers of flanges 2*b*, 2*c* of the photoconductor 2, the process cartridge 1 is positioned.

In the image forming apparatus of the first modification, the drum shaft hole 2*d* is provided on the far side flange 2*b* of the photoconductor 2, and a concave gear 111 having a conical pitch surface centering on the drum shaft hole 2*d* is provided on the outer surface of the flange 2*b*. The drum shaft hole 2*e* is provided on the near side flange 2*c*. The photoconductor 2 is supported by the surface plates 11, 18.

The drum shaft 2*a* is supported rotatably by the body side plate 91 through the shaft bearing 90, and the drum shaft 2*a* is coupled linearly to the motor shaft 81*a* of the photoconductor drive motor 81 by a photoconductor coupling unit 93 such as a coupling. A convex gear 110 having a conical pitch surface and the shaft bearing 15 are fixed to the drum shaft 2*a*.

When the process cartridge 1 is mounted, the drum shaft 2*a* penetrates the photoconductor 2, and the concave gear 111, and the convex gear 110 mates with each other. Simultaneously, a mating frame 11*a* as the positioned part of the surface plate 11 mates with the shaft bearing 15 as the positioning part on the drum shaft 2*a* to position the process cartridge 1.

In this configuration of the first modification, because the process cartridge 1 is positioned to the printer body with the drum shaft 2*a* of the photoconductor 2 as the reference, the shaft center of the drive shaft 82 and the shaft center of the developing roller shaft 5*j* misalign with each other. However, because two pairs of the constant velocity joints arranged in series in the shaft direction are used as the coupling unit that couples the drive shaft 82 and the developing roller shaft 5*j*, the relay member 73 having a configuration in which the member on the drive shaft side of the first constant velocity joint 71 (the first female joint unit 712 in FIG. 13) and the member on the developing roller shaft side of the second constant velocity joint 72 (the second female joint unit 722 in FIG. 13) are formed integrally inclines; therefore, the drive shaft 82 and the developing roller shaft 5*j* can be coupled with each other even when the shaft centers of the drive shaft 82 and the developing roller shaft 5*j* misalign with each other. Inclination of the relay member generates the deviation a between the relay member and the drive shaft, and between the relay member and the developing roller shaft. Even when the deviation is generated between the relay member 73 and the developing roller shaft 5*j*, the first constant velocity joint 71 can transmit rotation on the drive shaft side to the developing roller shaft at a constant velocity; therefore, the developing roller can be rotated at a constant velocity. Thereby, rotational irregularity of the developing roller can be suppressed, and favorable images without concentration irregularity can be obtained.

In the above explanation, the apparatus using the coupling unit including two pairs of constant velocity joints for coupling the developing roller shaft of the developing roller of the developing unit as the driven unit of the process cartridge 1, and the drive shaft has been explained. However, for example, the coupling unit may use two pairs of constant velocity joints for coupling the charging roller shaft of the charging roller of the charging unit, and the drive shaft on the apparatus body side. The coupling unit may use two pairs of constant velocity joints for coupling the applying roller shaft of the lubricant applying roller, and the drive shaft on the apparatus body side. The coupling unit may use two pairs of constant velocity joints for coupling the shaft of the conveying auger of the cleaning device, and the drive shaft on the apparatus body side. The above embodiments can be applied to a fixing unit, a transfer unit, a secondary transfer unit or the like as well as a process cartridge.

Figure 16:
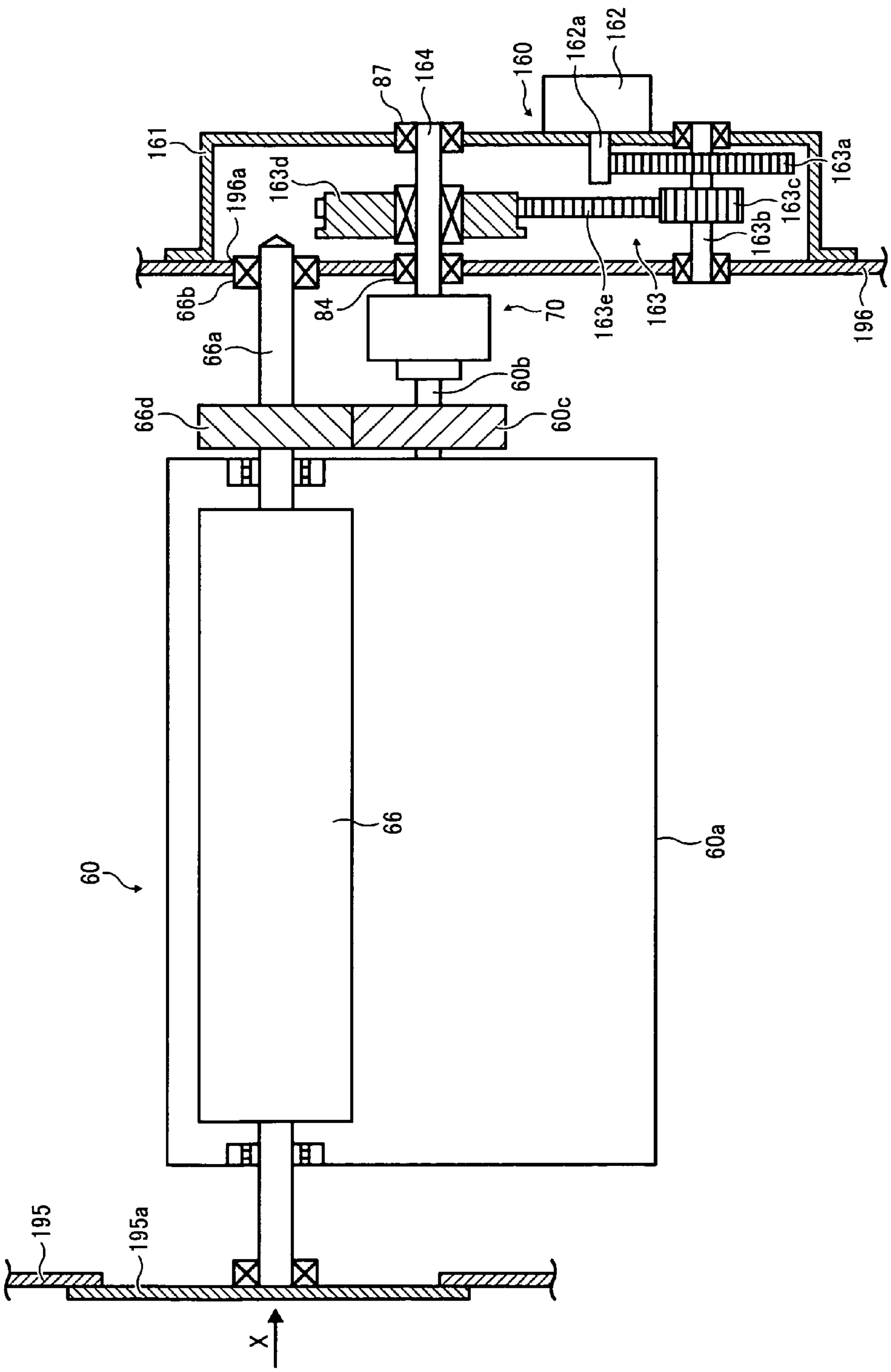
FIG. 16 is a schematic of a configuration of the image forming apparatus near a fixing unit.

FIG. 16 is a configuration diagram of the fixing unit 60.

Because the internal configuration of a case of the fixing unit 60 shown in FIG. 16 has been explained above, only main parts are explained here.

A roller gear 66*d* is fixed to a shaft 66*a* of the drive roller 66 arranged in a case 60*a*. A drive gear 60*c* fixed to a driven shaft 60*b* rotatably supported to the side surface of the case 60*a* meshes the roller gear 66*d*. The first female joint unit 712 or the first male joint 711 of the first constant velocity joint 71 is concentrically fixed at the tip of the driven shaft 60*b*. One end of the shaft 66*a* of the drive roller 66 is rotatably supported by a surface plate 195*a* attached detachably to a front plate 195 of the printer body, and the other end is supported rotatably by a hole 196*a* of a far side plate 196 through a shaft bearing 66*b*.

A drive device 160 is fixed to the far side plate 196 of the image forming apparatus body, and includes a retaining plate 161, a drive motor 162 as a drive source, a transmission mechanism 163, and a drive shaft 164. The drive motor 162 is fixed to the retaining plate 161. The transmission mechanism 163 includes a transmission gear 163*a*, a drive pulley 163*c*, a driven pulley 163*d*, and a timing belt 163*e*. The transmission gear 163*a* is fixed to a rotation shaft 163*b* supported rotatably by the far side plate 196 of the retaining plate 161, and meshes an output gear 162*a* extending from the drive motor 162. The drive pulley 163*c* is fixed to the rotation shaft 163*b*, and the timing belt 163*e* is stretched by the drive pulley 163*c* and the driven pulley 163*d*. The driven pulley 163*d* is fixed to the drive shaft 164 supported rotatably by the retaining plate 161 and the far side plate 196. Rotation of the drive motor 162 is transmitted to the drive shaft 164 through the output gear 162*a*, the transmission gear 163*a*, the rotation shaft 163*b*, the drive pulley 163*c*, the timing belt 163*e*, and the driven pulley 163*d*.

The second female joint unit 722 or the second male joint 721 of the second constant velocity joint 72 is concentrically fixed to the fixing roller side end of the drive shaft 164. The drive shaft 164 is retained rotatably by the retaining plate 161 through the shaft bearing 87, and mates rotatably with the far side plate 196 through the shaft bearing 84.

As shown in FIG. 16, when the fixing unit 60 is mounted on the apparatus body, the fixing unit 60 is positioned to the apparatus body by the shaft bearing 66*b* fixed to the shaft 66*a* of the drive roller 66 mating with the hole 196*a* of the far side plate 196. At this time, even when the shaft center of a driven shaft 60*n* and the shaft center of the drive shaft 164 misalign with each other due to accumulation of the tolerance, the relay member of the coupling unit inclines, and the drive shaft and the driven shaft are coupled. Because the constant velocity joint couples the drive shaft and the driven shaft, the drive roller can rotate at a constant velocity even when deviation is generated in the drive shaft. Thereby, formation of abnormal images having fixation irregularity or the like can be suppressed.

Figure 17:
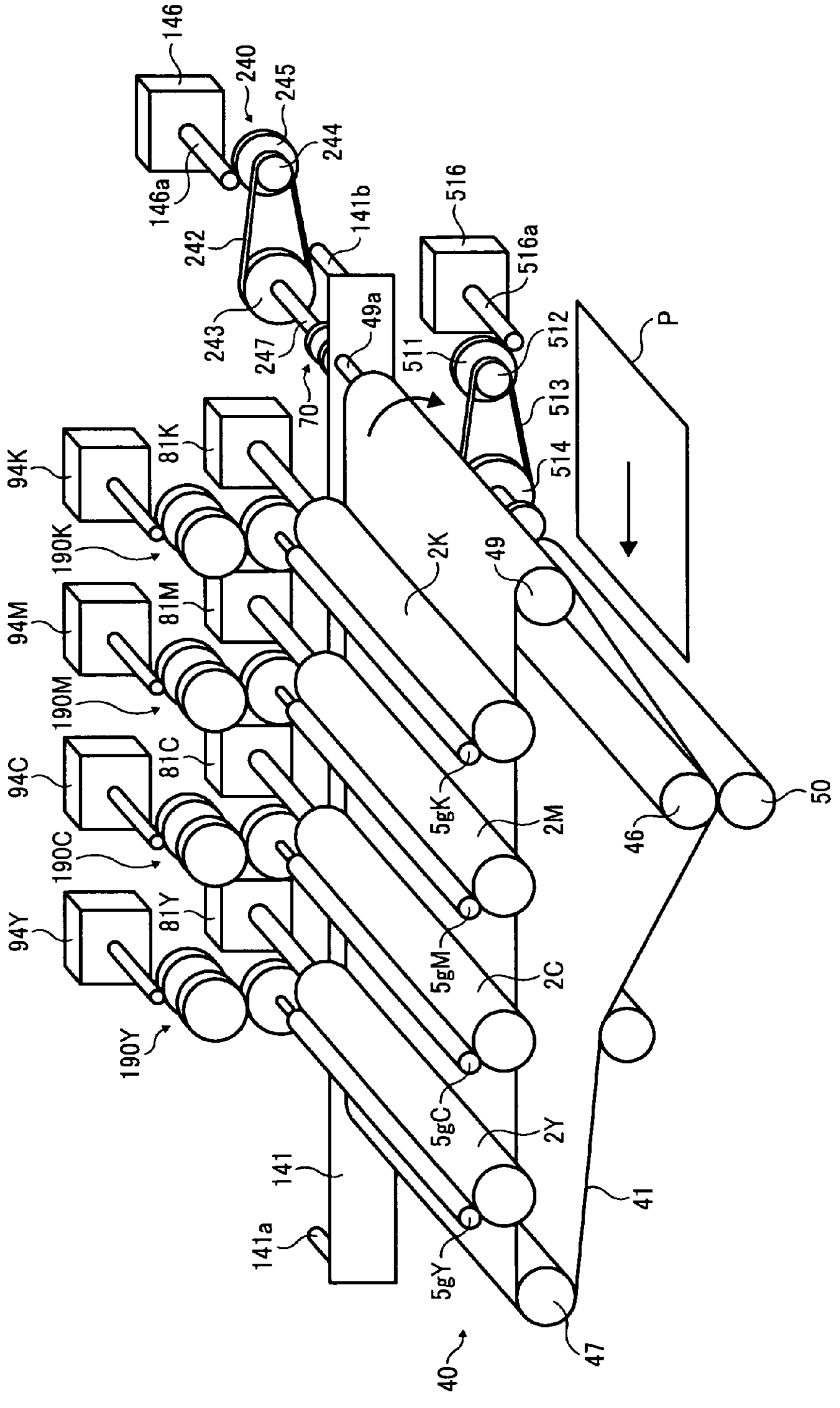
FIG. 17 is a perspective view of parts of the image forming apparatus near a transfer unit.
Figure 18:
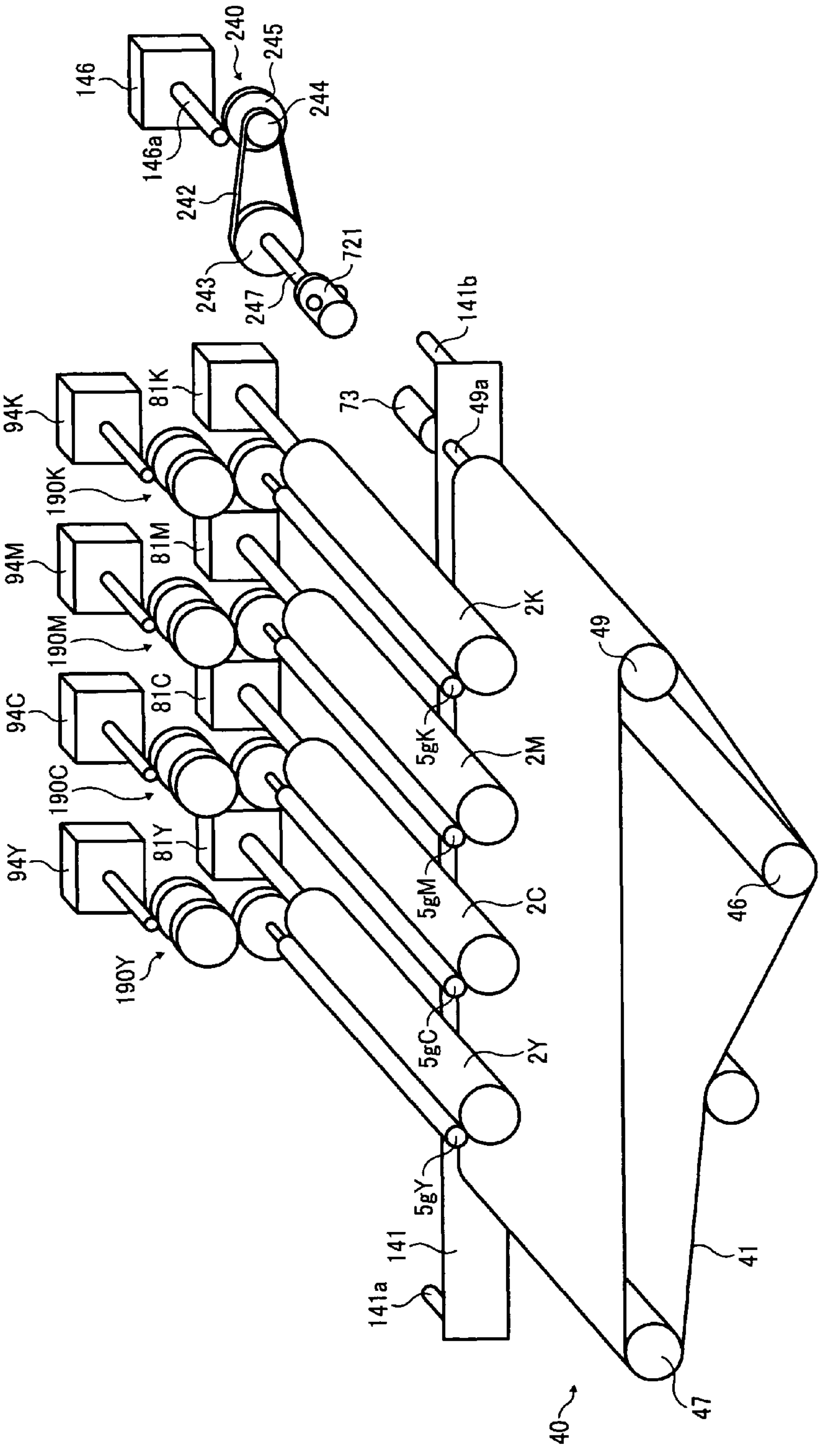
FIG. 18 is a perspective view of a state where the transfer unit is mounted on the apparatus body.

FIG. 17 is a schematic of an image forming apparatus near the transfer unit 40, and FIG. 18 is a schematic of a state of mounting the transfer unit 40 on the apparatus body. Because the internal configuration of the case of the transfer unit 40 shown in FIGS. 17 and 18 have already been explained above, only the main parts are explained here.

The rotations shafts of the drive roller 47 and the rollers 49, 46 that stretch the intermediate image transfer belt 41 are supported rotatably by the near-side side plate (not shown) and a far-side side plate 141 of the case of the transfer unit 40. A transfer-unit master reference pin 141*b* and a subordinate reference pin 141*a* are provided on the far-side side plate 141 of the transfer unit 40.

The apparatus body includes an intermediate image transfer motor 146 as a drive source, and a drive transmission unit 240. The drive transmission unit 240 is configured with an idler gear 245, a first pulley 244, a second pulley 243, a drive shaft 247, a timing belt 242, and the like. The idler gear 245 meshes a motor shaft 146*a* of the intermediate image transfer motor 146, and the first pulley 244 is attached coaxially with the idler gear 245. The second pulley 243 is fixed to the drive shaft 247, and the timing belt 242 is wrapped around the first pulley 244 and the second pulley 243.

A rotation shaft 49*a* of the drive roller 49 as a drive shaft penetrates from the far-side side plate 141, and the rotation shaft 49*a* and the drive shaft 247 are coupled by the coupling unit 70.

As shown in FIG. 18, when the transfer unit 40 is mounted on the apparatus body, the transfer-unit master reference pin 141*b* is inserted into a master reference hole (not shown) provided in the apparatus body, and the subordinate reference pin 141*a* is inserted into a subordinate reference hole (not shown) provided in the apparatus body; thereby, the transfer unit 40 is positioned to the apparatus body. When the transfer unit 40 is further inserted into the apparatus body while the transfer unit 40 is positioned to the apparatus body in this way, the rotation shaft 49*a* of the drive roller 49, and the drive shaft 247 are coupled by the coupling unit 70, and the transfer unit 40 is thereby assembled with the apparatus body.

By using the coupling unit including the two constant velocity joints arranged in series in the shaft direction for coupling of the rotation shaft 49*a* of the transfer unit 40, and the drive shaft 247 of the drive roller 49, the drive shaft 247 and the rotation shaft 49*a* can be coupled with each other even when the shaft centers of the drive shaft 247 and the rotation shaft 49*a* misalign with each other. Rotation of the drive shaft 247 can be transmitted at a constant velocity.

Figure 19:
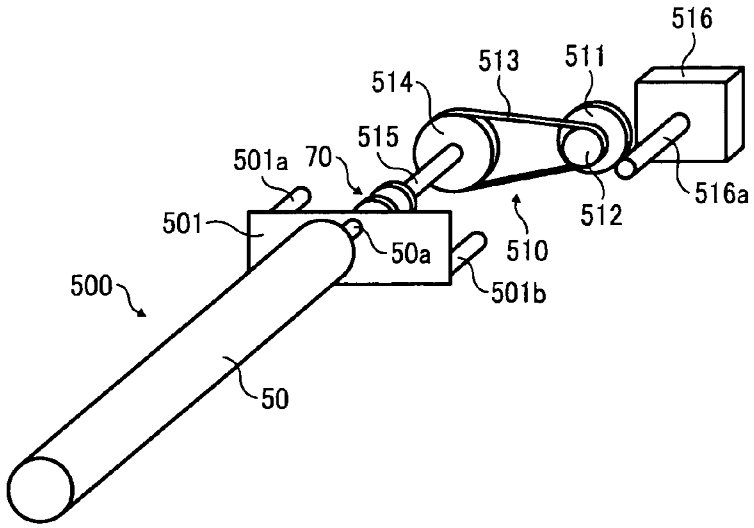
FIG. 19 is a perspective view of the image forming apparatus near a secondary transfer unit.
Figure 20:
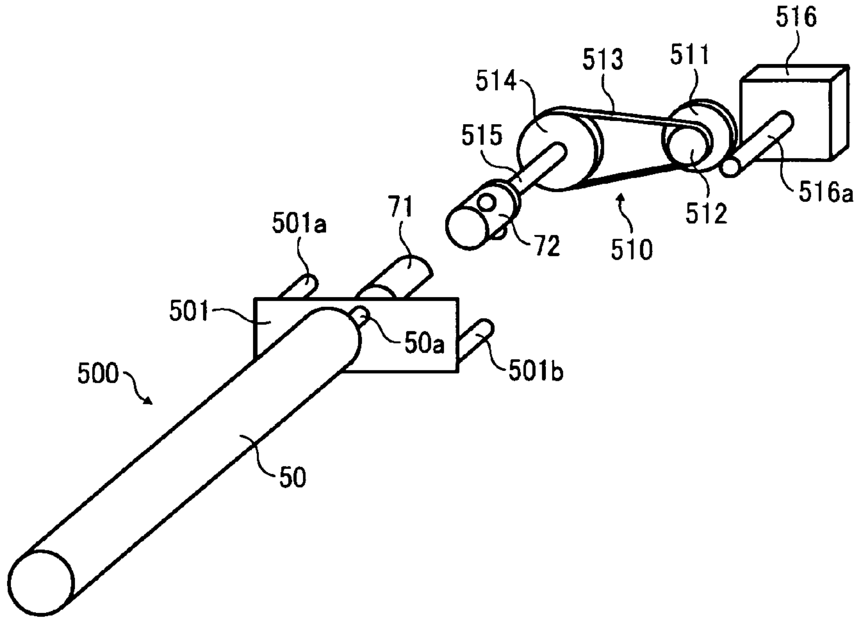
FIG. 20 is a perspective view of a state where the secondary transfer unit is mounted on the apparatus body.

FIG. 19 is a schematic of an image forming apparatus near a secondary transfer unit 500, and FIG. 20 is a schematic of a state of mounting the secondary transfer unit 500 on the apparatus body.

A rotation shaft 50*a* of the secondary image transfer roller 50 is rotatably supported by a near-side side plate (not shown) of a case of the secondary transfer unit 500, and a far-side side plate 501. A secondary transfer-unit master reference pin 501*b*, and a subordinate reference pin 501*a* are provided in the far-side side plate 501 of the secondary transfer unit 500.

The apparatus body includes a secondary transfer motor 516 as a drive source, and a drive transmission unit 510. The drive transmission unit 510 is configured with an idler gear 511, a first pulley 512, a second pulley 514, a drive shaft 515, a timing belt 513, and the like. A motor shaft 516*a* of the secondary transfer motor 516 meshes the idler gear 511, and the first pulley 512 is attached coaxially with the idler gear 511. The second pulley 514 is fixed to the drive shaft 515, and the timing belt 513 is wrapped around the first pulley 512 and the second pulley 514.

The rotation shaft 50*a* of the secondary image transfer roller 50 as a driven shaft penetrates from the far-side side plate 501, and the rotation shaft 50*a* and the drive shaft 515 are coupled by the coupling unit 70.

As shown in FIG. 20, when the secondary transfer unit 500 is mounted on the apparatus body, the secondary transfer-unit master reference pin 501*b* is inserted into a master reference hole (not shown) provided in the apparatus body, and the subordinate reference pin 501*a* is inserted into a subordinate reference hole (not shown) provided in the apparatus body; thereby, the secondary transfer unit 500 is positioned to the apparatus body. When the secondary transfer unit 500 is further inserted into the apparatus body while the secondary transfer unit 500 is positioned to the apparatus body, the rotation shaft 50*a* of the secondary image transfer roller 50, and the drive shaft 515 are coupled by the coupling unit 70, and the secondary transfer unit 500 is thereby assembled with the apparatus body.

By using the coupling unit 70 including the two constant velocity joints arranged in series in the shaft direction for coupling of the rotation shaft 50*a* of the secondary image transfer roller 50 of the secondary transfer unit 500 and the drive shaft 515, the drive shaft 515 and the rotation shaft 50*a* can be coupled with each other even when the shaft centers of the drive shaft 515 and the rotation shaft 50*a* misalign with each other. Rotation of the drive shaft 515 can be transmitted to the rotation shaft 50*a* at a constant velocity, and the secondary image transfer roller 50 can be rotated at a constant velocity.

The embodiments can be applied to an image forming apparatus in which a developing unit is detached singly from the apparatus body, a developing roller shaft and a drive shaft of the apparatus body are coupled with each other, and a conveying screw shaft is coupled with a second drive shaft of the apparatus body. In this case, the developing unit is positioned to the apparatus body by coupling the developing roller shaft and the drive shaft of the apparatus body. As a result, the shaft centers of the conveying screw shaft and the second drive shaft may misalign with each other. Therefore, the coupling including the two pairs of constant velocity joints is used for coupling of the conveying screw shaft and the second drive shaft.

The coupling unit may be used for coupling of the shafts of the paper conveying rollers of the paper conveying units that convey the image transfer paper P such as a finisher unit, a paper feeding unit, an inverting unit, and a paper discharge unit. The finisher unit, for example, sorts, punches, and staples the image transfer paper P while conveying the image transfer paper P that have passed the fixing device, and includes a plurality of paper conveying rollers for conveying the image transfer paper P. The paper feeding unit takes up the image transfer paper P from the paper feeding cassette housing the image transfer paper P, and conveys the image transfer paper P to an image transfer position at which an image is transferred to the image transfer paper P, and includes a paper feeding roller for taking up the image transfer paper P from the paper feeding cassette and a registration roller, as well as a plurality of paper conveying rollers. The inverting unit inverts the image transfer paper P that has passed the fixing device, and conveys the image transfer paper P again to the transfer position, and includes a plurality of paper conveying rollers. The paper discharge unit conveys the image transfer paper P that has passed the fixing device to the outside of the apparatus, and includes a plurality of paper conveying rollers and a paper discharge roller for discharging the image transfer paper P to the outside of the apparatus.

The image forming apparatus includes a paper conveying unit that conveys the image transfer paper P from the transfer position to the fixing position.

The paper conveying units such as the finisher unit, and the paper feeding unit are configured to be taken out from the apparatus body so that jammed paper can be easily found and removed. When the paper conveying unit is drawn out of the apparatus body, the shaft of the paper conveying roller for conveying paper, and a drive shaft for transmitting drive force to the paper conveying roller are uncoupled, and when the paper conveying unit is pushed into the apparatus body, the shaft of the paper conveying roller, and the drive shaft are coupled.

Because of the configuration, the drive shaft may incline relative to the shaft of the paper conveying roller due to variance of part precisions or assembly accuracy, and the shaft center of the drive shaft and the shaft center of the paper conveying roller may misalign with each other; thereby, the drive shaft and the rotation shaft may not be able to be coupled with each other sometimes. Even when the drive shaft and the rotation shaft can be coupled with each other, deviation is generate between the rotation shaft of the paper conveying roller and the drive shaft, and the paper conveying roller rotates irregularly. When the paper conveying roller rotates irregularly, relative conveying speeds of the image transfer paper P conveyed by the paper conveying roller and other units vary from each other, the image transfer paper skews or deflects, and this may exert an adverse influence on image transferability and fixability.

By coupling the shafts of the paper conveying rollers of the paper conveying units that convey the image transfer paper P such as the finisher unit, the paper feeding unit, the inverting unit, and the paper discharge unit, and the drive unit using the coupling device, the shafts of the paper conveying rollers and the drive shaft can be coupled even when the shafts of the paper conveying rollers and the drive shaft misalign with each other, or deviate relative to each other; thereby, the paper conveying roller can be rotated at a constant velocity. This is explained specifically using FIGS. 21 and 22.

Figure 21:
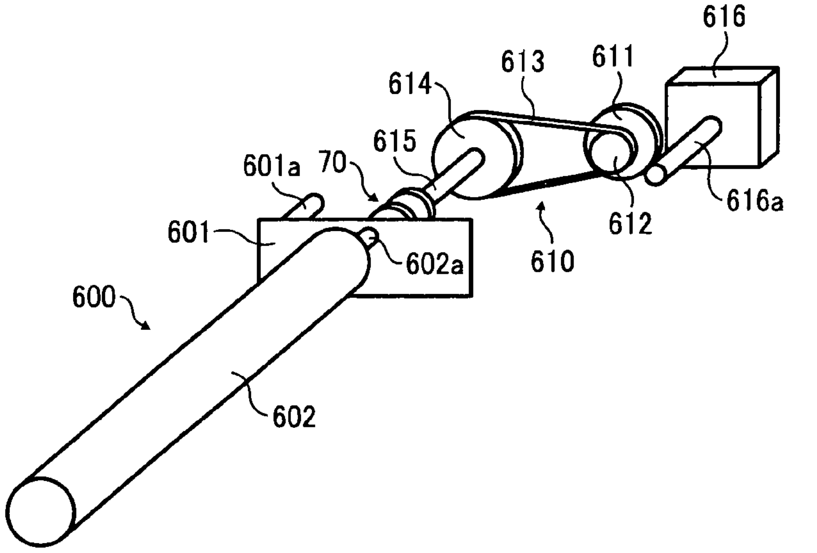
FIG. 21 is a perspective view of main parts of a paper conveying unit.
Figure 22:
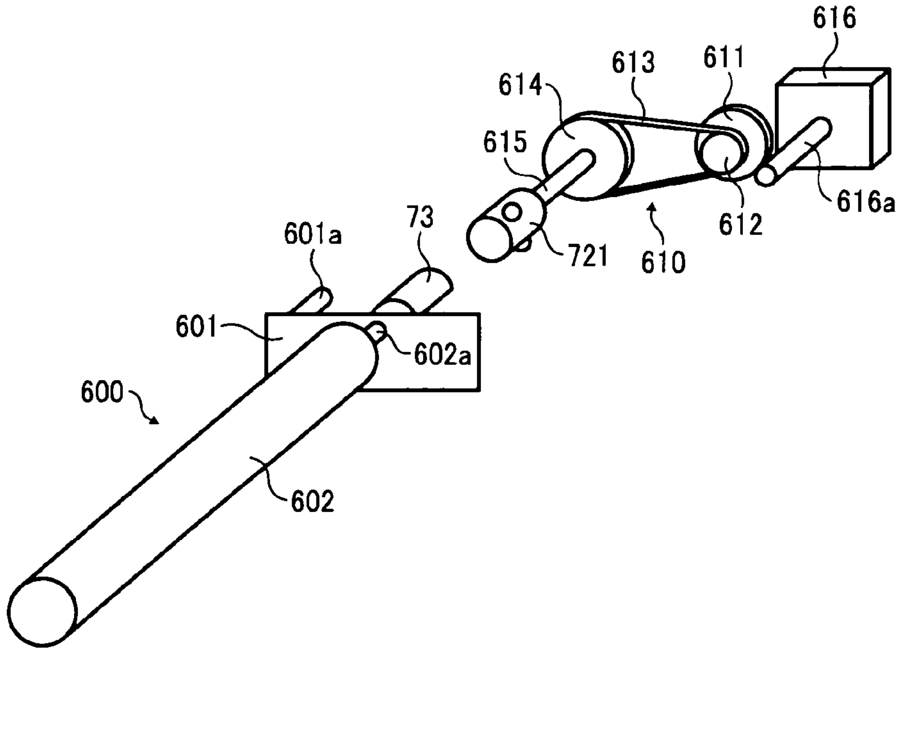
FIG. 22 is a schematic of a state where the paper conveying unit is mounted on the apparatus body.

FIG. 21 is a schematic of a paper conveying unit 600, and FIG. 22 is a schematic of a state of mounting the paper conveying unit 600 on the apparatus body.

The paper conveying unit 600 includes a paper conveying roller 602, and a driven conveying roller (not shown) that forms a conveying nip by pressing on the paper conveying roller 602. The paper conveying roller 602 and the driven conveying roller (not shown) are supported rotatably by a near-side side plate (not shown) and a far-side side plate 601 of a case of the paper conveying unit 600. A paper-conveying-unit positioning pin 601*a* is provided on the far-side side plate 601.

The apparatus body includes a paper conveying motor 616 as a drive source, and a drive transmission unit 610. The drive transmission unit 610 is configured with an idler gear 611, a first pulley 612, a second pulley 614, a drive shaft 615, a timing belt 613, and the like. The idler gear 611 meshes a motor shaft 616*a* of the paper conveying motor 616, and the first pulley 612 is attached coaxially with the idler gear 611. The second pulley 614 is fixed to the drive shaft 615, and the timing belt 613 is wrapped around the first pulley 612, and the second pulley 614.

A rotation shaft 602*a* of the paper conveying roller 602 as a driven shaft penetrates the far-side side plate 601, and the rotation shaft 602*a* and the drive shaft 615 are coupled by the coupling unit 70.

As shown in FIG. 22, when the paper conveying unit 600 is mounted on the apparatus body, the paper-conveying-unit positioning pin 601*a* is inserted into a positioning hole (not shown) provided on the apparatus body, and the paper conveying unit 600 is positioned to the apparatus body. By inserting the paper conveying unit 600 further to the apparatus body while the paper conveying unit 600 is positioned to the apparatus body in this manner, the rotation shaft 602*a* of the paper conveying roller 602, and the drive shaft 615 are coupled by the coupling unit 70 and the paper conveying unit 600 is assembled with the apparatus body.

By using the coupling unit 70 including the two constant velocity joints arranged in series in the shaft direction for coupling the rotation shaft 602*a* of the paper conveying roller 602 of the paper conveying unit 600 and the drive shaft 615, the drive shaft 615 and the rotation shaft 602*a* can be coupled even when the shaft centers of the drive shaft 615 and the rotation shaft 602*a* misalign with each other. The rotation of the drive shaft 615 can be transmitted to the rotation shaft 602*a* at a constant velocity, and the paper conveying roller 602 can be rotated at a constant velocity. Accordingly, even when the part precision or the assembly accuracy varies, the paper conveying unit 600 can be assembled with the apparatus body, and paper can be conveyed stably.

Figure 23:
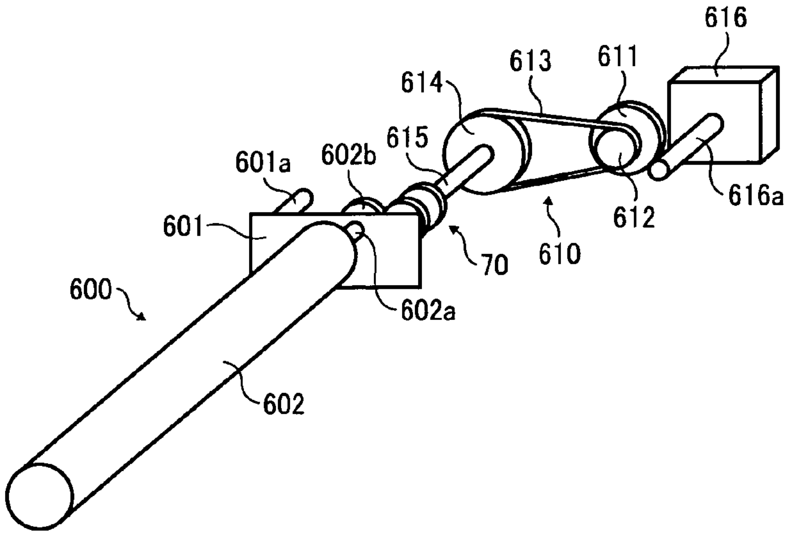
FIG. 23 is a perspective view of a paper conveying unit of another embodiment of the present invention.

Although, in the above, the coupling unit 70 is attached to the rotation shaft 602*a* of the paper conveying roller 602, alternatively a paper conveying roller gear 602*b* is attached to the rotation shaft 602*a* of the paper conveying roller 602, a paper conveying driven gear (not shown) that meshes the paper conveying roller gear 602*b* is fixed, the coupling unit 70 is attached to a driven shaft (not shown) attached rotatably to the far-side side plate 601, and thereby the drive shaft 615 and the rotation shaft 602*a* of a paper conveying roller 60*s* are coupled with each other indirectly, as shown in FIG. 23.

Application of the embodiments is not limited to a color image forming apparatus of an intermediate transfer tandem system.

Figure 24:
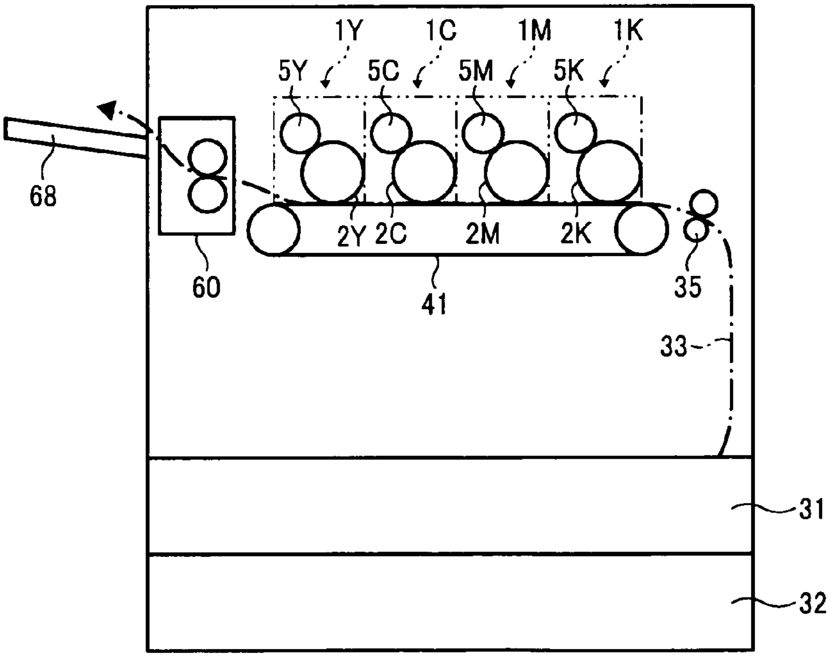
FIG. 24 is a schematic of a tandem color image forming apparatus of a direct image transfer system.

For example, as shown in FIG. 24, the embodiments can be applied to a color image forming apparatus of a direct image transfer tandem system.

Figure 25:
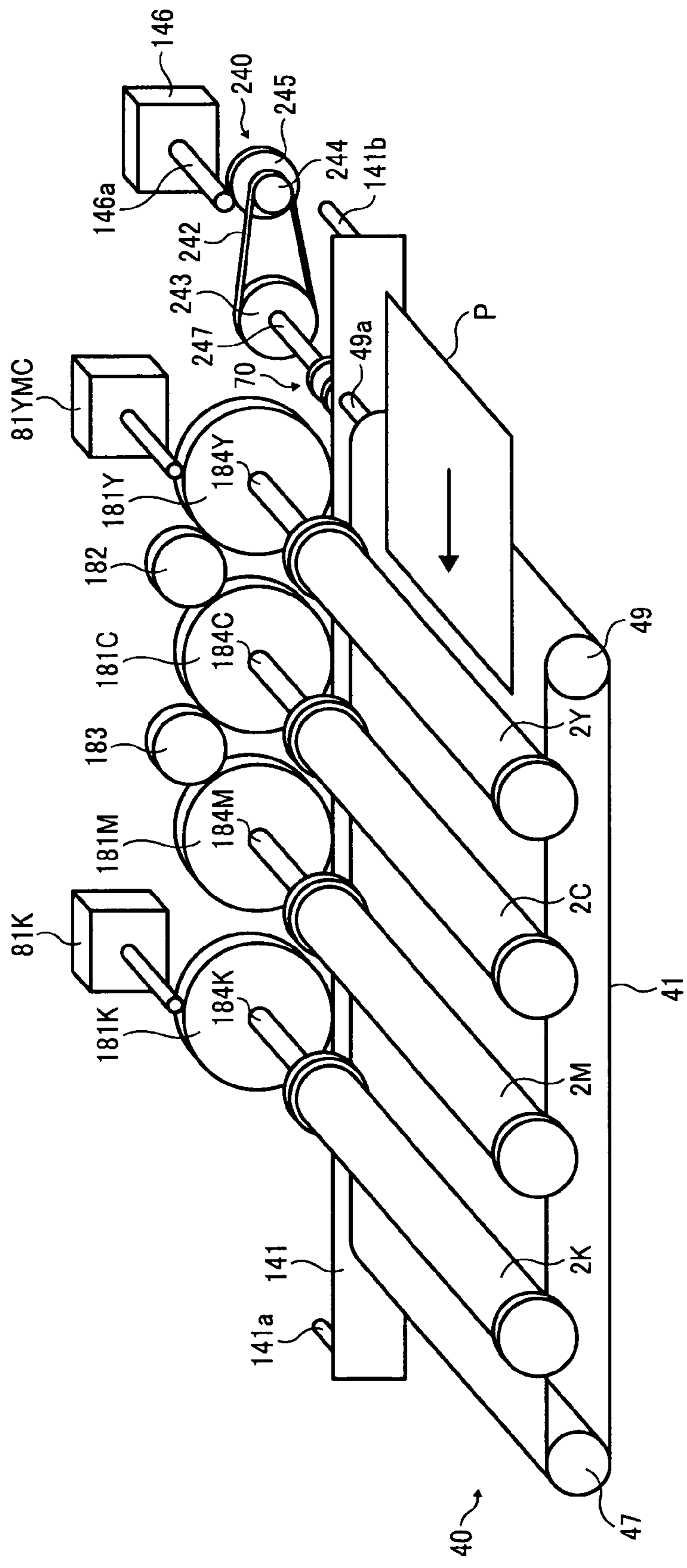
FIG. 25 is a perspective view of a portion near the transfer unit in the direct image transfer tandem system color image forming apparatus.

FIG. 25 is a schematic of an example in which the coupling unit is used for coupling of the drive shaft 247 and the rotation shaft 49*a* of the drive roller 49 that rotation-drives a paper conveying belt as a recording material conveying member of the transfer unit 40 of a direct image transfer tandem system color image forming apparatus.

Figure 26:
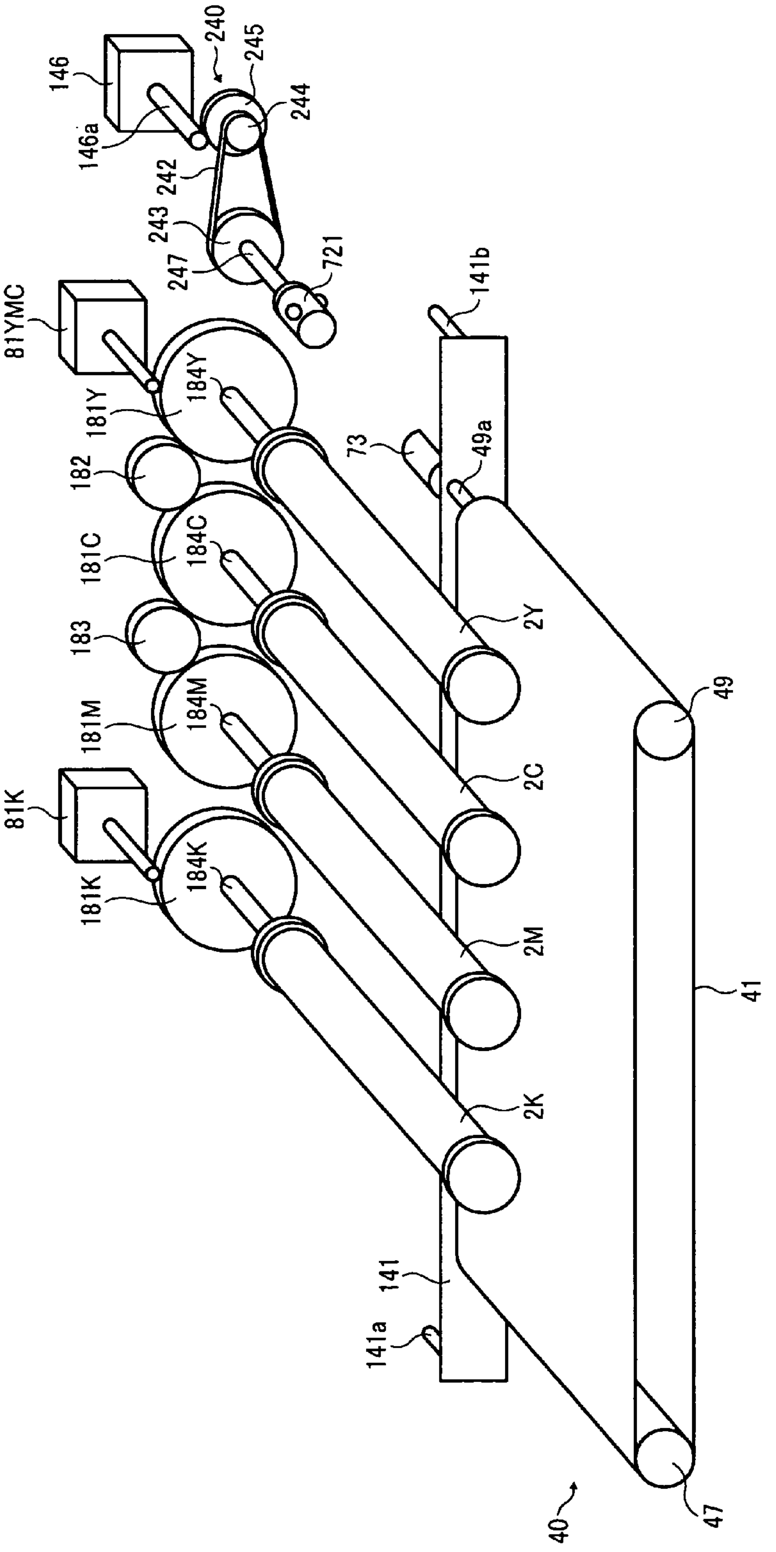
FIG. 26 is a perspective view of a state where the transfer unit is mounted on the direct image transfer tandem system color image forming apparatus.

FIG. 26 is a schematic of a state of mounting the transfer unit 40 of a direct image transfer tandem system color image forming apparatus on the apparatus body.

As shown in FIG. 25, a photoconductor motor 81K for rotation-driving a photoconductor for K, and a color photoconductor motor 81YMC for rotation-driving photoconductors for Y, M, and C are provided on the apparatus body. A K drum gear 181K meshes a motor shaft of the K photoconductor motor 81K.

A Y drum gear 181Y meshes a motor shaft of the color photoconductor motor 81YMC, and a first idler gear 182 is disposed between the Y drum gear 181Y, and a C drum gear 181C, to mesh these gears. A second idler gear 183 is disposed between the C drum gear 181C, and an M drum gear 181M to mesh these gears.

The drum gears 181Y, 181C, 181M, and 181K are fixed to drive shafts 184Y, 184C, 184M, and 184K, respectively. The drive shafts 184Y, 184C, 184M, and 184K, and rotation shafts (not shown) of the photoconductors 2Y, 2C, 2M, and 2K are coupled with each other by a coupling unit (not shown).

By rotation-driving the color photoconductor motor 81YMC, drive force of the color photoconductor motor 81YMC is transmitted to the Y drum gear 181Y through the motor shaft. The transmitted drive force of the Y photoconductor drum 181Y is transmitted to the C drum gear 181C through the first idler gear 182, and the drive force transmitted to the C drum gear 181C is transmitted to the M drum gear 181M through the second idler gear 183. Thereby, the photoconductors 2Y, 2C, and 2M are rotated by the color photoconductor motor 81YMC.

The rotation shafts of the drive roller 47 and the rollers 49 and 46 that stretch the intermediate image transfer belt 41 are supported rotatably by a near-side side plate (not shown) and the far-side side plate 141 of a case of the transfer unit 40. The transfer-unit master reference pin 141*b* and the subordinate reference pin 141*a* are provided on the far-side side plate 141 of the transfer unit 40.

The apparatus body includes the intermediate image transfer motor 146 as a drive source and the drive transmission unit 240. The drive transmission unit 240 is configured with the idler gear 245, the first pulley 244, the second pulley 243, the drive shaft 247, the timing belt 242, and the like. The idler gear 245 meshes the motor shaft 146*a* of the intermediate image transfer motor 146, and the first pulley 244 is attached coaxially with the idler gear 245. The second pulley 243 is fixed to the drive shaft 247, and the timing belt 242 is wrapped around the first pulley 244, and the second pulley 243.

The rotation shaft 49*a* of the drive roller 49 as a driven shaft penetrates from the far-side side plate 141, and the rotation shaft 49*a*, and the drive shaft 247 are coupled by the coupling unit 70.

As shown in FIG. 26, when the transfer unit 40 is mounted on the apparatus body, the transfer-unit master reference pin 141*b* is inserted into a master reference hole (not shown) provided on the apparatus body, and the subordinate reference pin 141*a* is inserted into a subordinate reference hole (not shown) provided on the apparatus body; thereby, the transfer unit 40 is positioned to the apparatus body. By inserting the transfer unit 40 further to the apparatus body while the transfer unit 40 is positioned to the apparatus body in this manner, the rotation shaft 49*a* of the drive roller 49 and the drive shaft 247 are coupled with each other by the coupling unit, and the transfer unit 40 is assembled with the apparatus body.

By using the coupling unit 70 including the two constant velocity joints arranged in series in the shaft direction for coupling the rotation shaft 49*a* of the drive roller 49 of the transfer unit 40 and the drive shaft 247, the drive shaft 247 and the rotation shaft 49*a* can be coupled with each other even when the shaft centers of the drive shaft 247 and the rotation shaft 49*a* misalign with each other. Rotation of the drive shaft 247 can be transmitted to the rotation shaft at a constant velocity.

Figure 27:
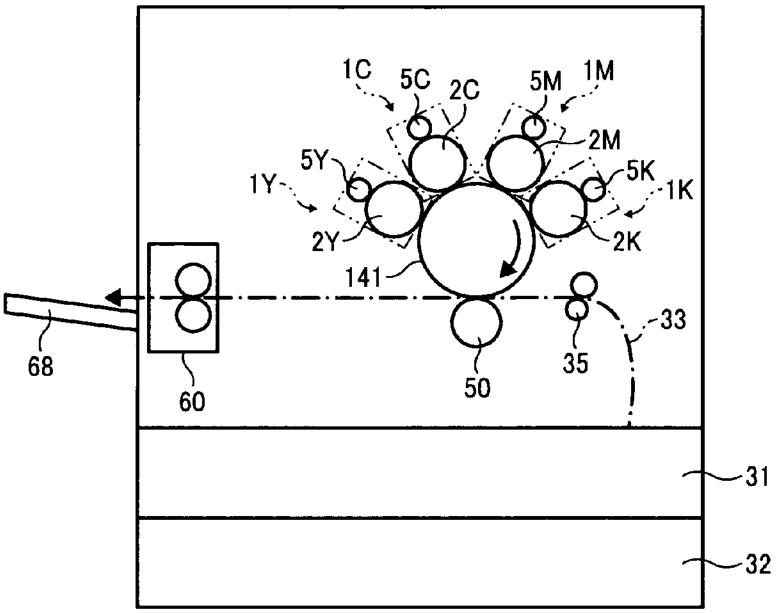
FIG. 27 is a schematic of a tandem color image forming apparatus of an intermediate image transfer system using an intermediate image transfer drum.
Figure 28:
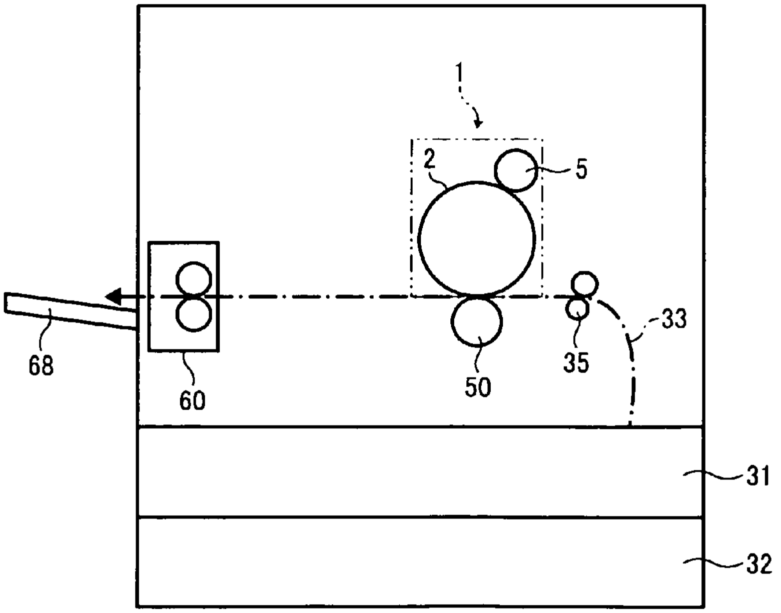
FIG. 28 is a schematic of a monochrome image forming apparatus.
Figure 29:
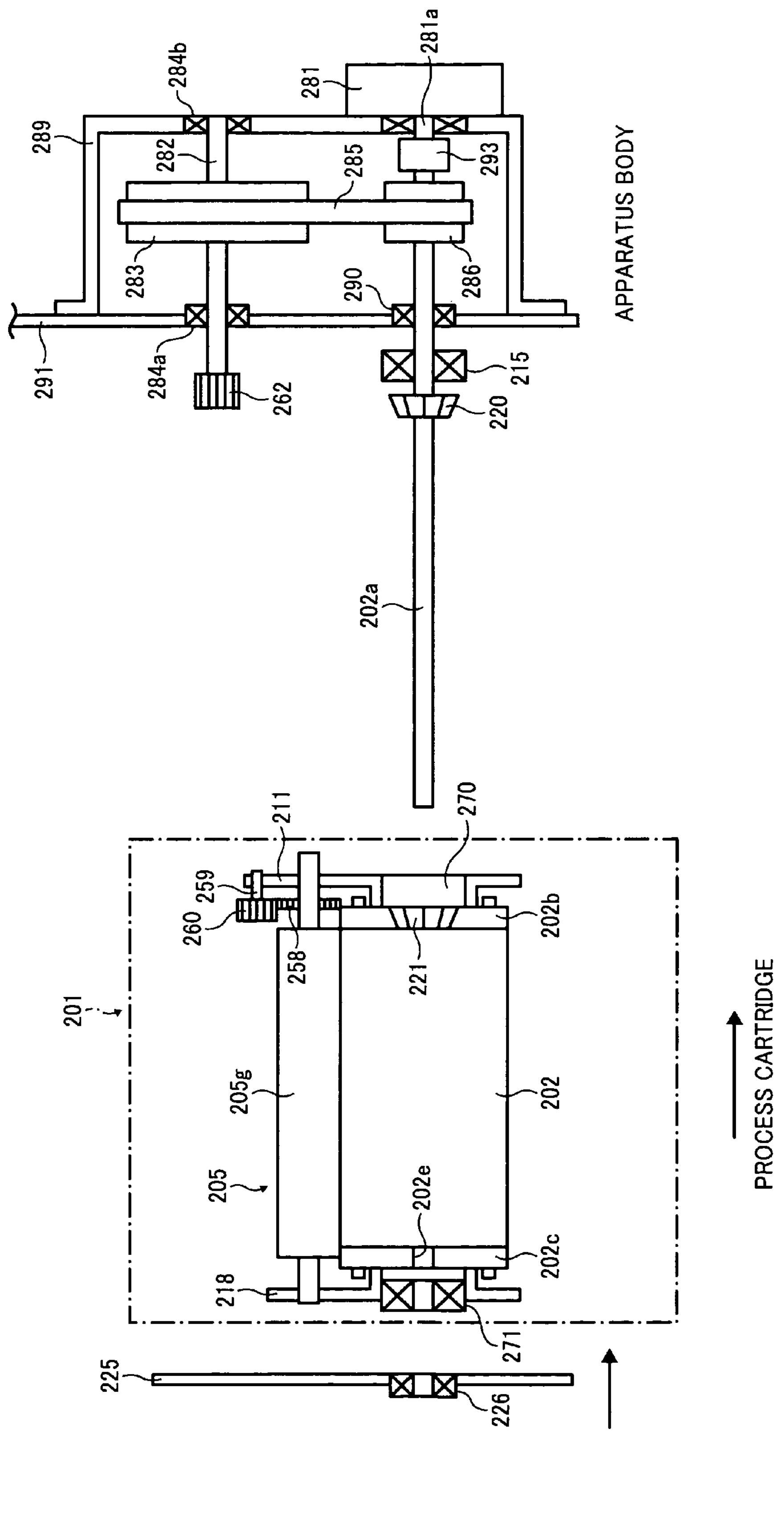
FIG. 29 is a schematic of a state before a process cartridge is mounted on an apparatus body in a conventional image forming apparatus.
Figure 30:
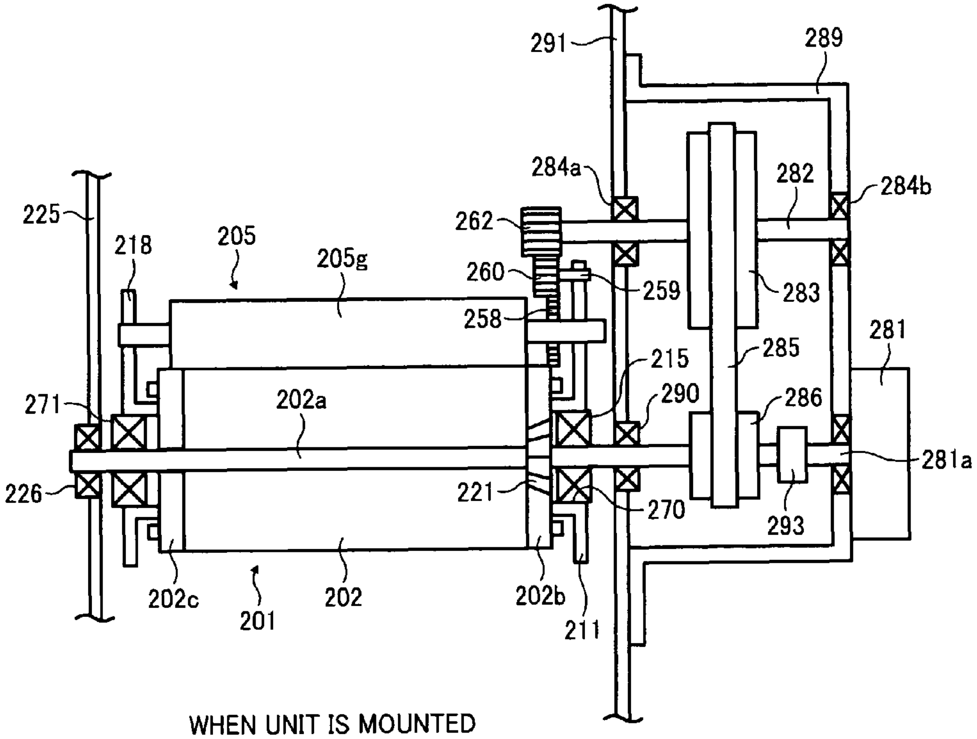
FIG. 30 is a schematic of a state where the process cartridge is mounted on the apparatus body in the conventional image forming apparatus.
Figure 31A:
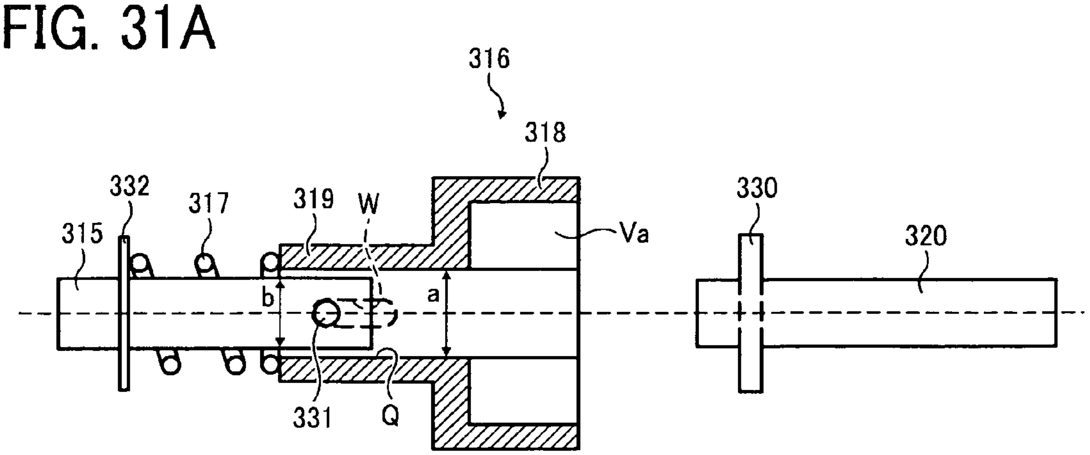
FIGS. 31A to 31C are schematics of a configuration of a coupling disclosed in Japanese Patent Application Laid-open No. 2004-45603.
Figure 31B:
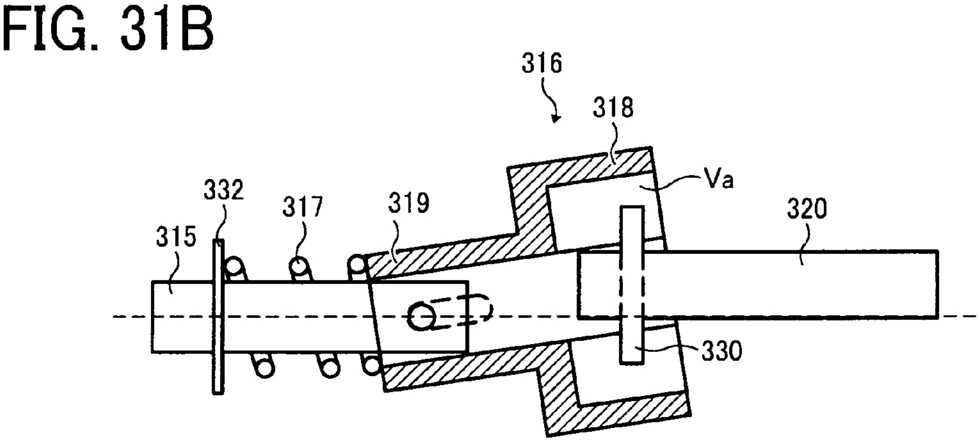
Figure 31C:
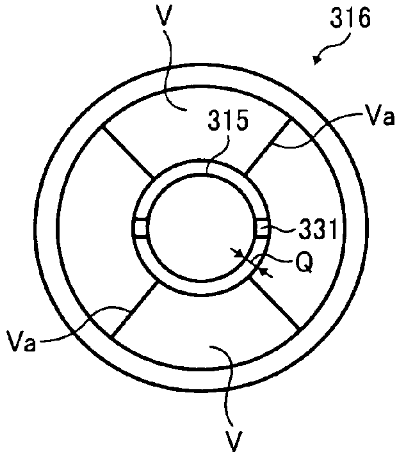
Figure 32A:
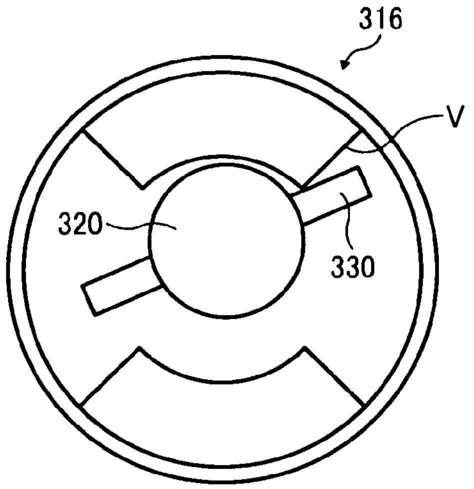
FIGS. 32A and 32B are schematics of a state of engagement between a drive pin and a coupling while the shaft center of the drive shaft, and the shaft center of the driven shaft misalign with each other.
Figure 32B:
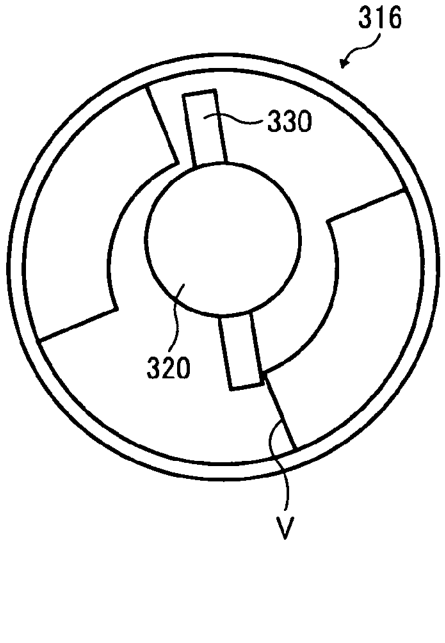

As shown in FIG. 27, the embodiments can be applied to a color image forming apparatus using the drum-shaped intermediate image transfer belt 41 in place of the intermediate image transfer body in the electrophotographic color image forming apparatus of intermediate transfer tandem system. Furthermore, as shown in FIG. 28, the embodiments can be applied to a monochrome image forming apparatus of direct image transfer system that includes the single process cartridge 1, and in which an image formed on the photoconductor 2 of the process cartridge 1, and the image is transferred by the secondary image transfer roller 50 to record the image on the recording material.

Although in the embodiment and the modifications, the pulley and the timing belt are used as a drive transmission mechanism from the drive source provided on the apparatus body side to the driven shaft, it is not limited thereto, and gear reduction drive system in which drive is transmitted while speed is reduced by a plurality of gears, or direct drive system in which drive is transmitted directly from a drive source without a speed reduction mechanism may be used, for example. In other words, the speed reduction mechanism provided on the apparatus body side is not limited particularly, but any speed reduction mechanism can be used.

The coupling unit 70 as a coupling device of the present embodiment includes a rotating body, and couples the drive shaft 82 and the developing roller shaft 5*j* as a driven shaft for transmitting drive force to the developing roller 5*g* that is a rotating body provided on the process cartridge 1 positioned to the apparatus body and detachable with respect to the apparatus body. The coupling unit 70 has an arrangement in which two constant velocity joints are arranged in series in the shaft direction. The arrangement includes a female joint as a ball non-retaining member including an annular space having an open end, and including track grooves (inner grooves or outer grooves) extending in the shaft direction on at least one of the inner circumference surface of an outer ring as the external wall surface of the annular space, and the outer circumference surface of the inner ring as the inner wall surface, the track grooves being formed at a constant interval in the circumferential direction, and a male joint as a ball retaining member that is partially formed in the annular space of the female joint, and retains a ball that slides along the track grooves formed on the female joint.

With this configuration, when the drive shaft 82 and the developing roller shaft 5*j* are to be coupled with each other while the shaft centers of the drive shaft 82 and the developing roller shaft 5*j* misalign with each other, deviation is generated between the female joint and the male joint of each constant velocity joint. However, the constant velocity joint can transmit rotation on the drive side to the driven side at a constant velocity even when deviation is generated between the male joint and the female joint. Accordingly, even when deviation is generated between the female joint and the male joint of each constant velocity joint, rotation of the drive shaft can be transmitted to the developing roller shaft at a constant velocity. As a result, the developing roller can be rotated at a constant velocity, and formation of abnormal images having concentration irregularity or the like can be suppressed.

When it is assumed that the constant velocity joint of the developing roller shaft side is the first constant velocity joint 71, and the constant velocity joint of the drive side is the second constant velocity joint 72, the drive shaft side member of the first constant velocity joint 71, and the developing roller shaft side member of the second constant velocity joint 72 are formed integrally (a relay member). In this way, by forming the drive shaft side member of the first constant velocity joint 71, and the developing roller shaft side member of the second constant velocity joint 72 integrally, the number of parts can be reduced, and the configuration of the coupling unit 70 can be simplified.

The first female joint unit 712 of the first constant velocity joint 71, and the second female joint unit 722 of the second constant velocity joint 72 are formed integrally. With this configuration, the first male joint and the second male joint 721 can be made common to each other, and part management cost can be lowered. The attachment direction of the relay member 73 needs not to be taken into consideration, and the attachment of the relay member 73 becomes easy.

Alternatively, the first female joint unit 712 of the first constant velocity joint 71, and the second male joint 721 of the second constant velocity joint 72 may be formed integrally. Also with this configuration, the first female joint and the second female joint can be made common to each other, and part management cost or the like can be lowered. The attachment direction of the relay member 73 needs not to be taken into consideration, and the attachment of the relay member 73 becomes easy.

The female joint and the male joint are engaged and separated with/from each other by either of the first constant velocity joint 71 and the second constant velocity joint 72 interlocking with attachment/detachment of the process cartridge 1. With this configuration, the number of parts can be reduced as compared with a configuration including a separation/engaging mechanism provided separately from two pairs of constant velocity joints. It becomes possible to eliminate drive transmission irregularity due to a separating/engaging mechanism.

A retaining mechanism that prevents the male joint from coming off the female joint is provided on the female joint of the constant velocity joint in which the female joint and the male joint are engaged and separated with/from each other interlocking with attachment/detachment of the process cartridge 1. Thereby, it becomes possible to, when the process cartridge 1 is taken out, prevent the female joint of the constant velocity joint, on which the engagement and separation are not performed, from coming off the male joint, and the relay member 73 from coming off the apparatus body.

The retaining mechanism is a retaining projection that protrudes from any one of an opening end of the inner circumference surface of an outer ring as the external wall surface of the annular space of the female joint and an opening of the outer circumference surface of an inner ring as the inner wall surface of the annular space or both. With this configuration, when the male joint is about to come off the female joint, an insertion part of the male joint inserted into the annular space of the female joint, or a ball hits the retaining projection, and the male joint is prevented from coming off the female joint.

The opening end of the female joint of the constant velocity joint on which the engagement and separation are not performed is elastically deformable, and the retaining projection and the female joint are formed integrally. By forming the retaining projection and the female joint integrally, the number of parts can be reduced, and part management cost or the like can be lowered. By making the opening end of the female joint elastically deformable, although when the insertion part of the male joint is inserted into the female joint, the insertion part or the ball hits the retaining projection, the insertion part of the male joint can be inserted into the annular space of the female joint by a so-called snap-fit in which the opening end of the female joint elastically deforms in the direction of diameter expansion by pushing the insertion part harder. In this way, the male joint can be engaged with the female joint only by pushing the male joint hard. Accordingly, the male joint and the female joint can be engaged with each other easily.

A ring-shaped elastic material is inserted into any one of the annular space between the male joint of the constant velocity joint on which the engagement and the separation are not performed and the inner circumference surface of the outer ring of the female joint and the annular space between the male joint and outer circumference surface of the inner ring of the female joint or both. With this configuration, inclination of either of the male joint and the female joint of the constant velocity joint on which the engagement and the separation are not performed due to its own weight can be suppressed thanks to elastic force of the elastic material at the time of separation of the constant velocity joint. As a result, when the process cartridge 1 is mounted on the apparatus body, a member on the side of the constant velocity joint on which the engagement and the separation are not performed never inclines largely. Accordingly, the insertion part of the male joint can be inserted into the annular space of the female joint interlocking with the mounting of the process cartridge 1 on the apparatus body.

The hardness of the elastic material is made lower than that of the material forming the female joint. With this configuration, even when the shaft center of the drive shaft and the shaft center of the developing roller shaft misalign with each other at the time of inserting the process cartridge 1 to the apparatus body to insert the insertion part of the male joint to the female joint, the relay member easily inclines, and the insertion part of the male joint can be inserted into the annular space of the female joint. Thereby, the process cartridge 1 can be smoothly inserted into the apparatus body.

The female joint and the male joint are formed with a resin having slidability. With this configuration, the ball can slide smoothly along the track grooves of the female joint without filling the annular space with lubricant such as grease. Thereby, operation sound becomes small as compared with a conventional configuration in which the female joint and the male joint are formed with a metal material.

By forming the ball with a resin having slidability, the ball can similarly slide smoothly along the track grooves of the female joint without filling the annular space with lubricant such as grease. All of the ball, the female joint, and the male joint may be formed with a resin having slidability.

Because a resin having slidability is material that can be injection-molded, the ball, the female joint, and the male joint can be molded easily by injection molding.

The diameter of the through hole as a ball retaining hole of the male joint is made larger than the diameter of the ball. Thereby, the ball can move through the through hole in the radial direction, and when the ball hits on the outer ring of the female joint at the time of inserting the insertion part of the male joint to the female joint, the ball moves toward the shaft center. As a result, the ball protrudes less from the insertion part, the insertion part can be inserted smoothly to the female joint, and the mountability of the unit to the apparatus body can be improved.

The tolerance is set such that the distance D from the outer groove to the inner groove is made longer than the diameter B of the ball. Therefore, voids are formed between the ball and the outer groove, and the ball and the inner groove. Thereby, the ball is prevented from being press-fitted between the grooves, and the sliding resistance of the ball to the outer groove and the inner grooves can be surely suppressed from increasing. Accordingly, wear and creep phenomenon of the outer groove and the inner groove can be suppressed, and the service life of the female joint can be made longer. Because the ball can slide smoothly in the grooves, the developing roller as a rotating body can be rotated surely at a constant velocity.

By using the coupling unit 70 in the image forming apparatus, the developing roller can be rotated at a constant velocity even when the shaft center of the developing roller shaft and the shaft center of the drive shaft misalign with each other; therefore, favorable images without concentration irregularity or the like can be obtained.

When the electromagnetic clutch is provided in the drive transmission mechanism that transmits drive force of the development drive motor as a drive source to the drive shaft, and the coupling unit 70 couples the drive shaft and the developing roller shaft, the electromagnetic clutch cuts the coupling between the development drive motor and the drive shaft. With this configuration, when the drive shaft and the developing roller shaft are coupled with each other, the torque of the development drive motor is not applied on the drive shaft, and the drive shaft rotates easily. Accordingly, when the phases of the track groves (the outer groove and the inner groove) and the ball are different, and the ball abuts on the outer groove guiding part and the inner groove guiding part at the time of inserting the process cartridge 1 to the apparatus body, and inserting the insertion part of the male joint of the constant velocity joint to the annular space of the female joint, a member of the drive shaft side of the constant velocity joint rotates easily, the phases of the ball and the track grooves (the outer groove and the inner groove) match with each other, and the ball can be easily inserted between the track grooves. Accordingly, even when the phases of the track grooves (the inner groove and the outer groove) of the constant velocity joint and the ball are different from each other at the time of inserting the process cartridge 1, the insertion part of the male joint can be inserted into the annular space of the female joint without increasing the insertion resistance of the process cartridge 1.

The electromagnetic clutch is provided on the drive transmission unit of the developing unit 5 as a transmission mechanism for transmitting drive force transmitted to the developing roller shaft to the conveying screw as a rotating body. When the coupling unit couples the drive shaft and the developing roller shaft, the electromagnetic clutch cuts the coupling of the developing roller shaft. Thereby, when the drive shaft 82 and the developing roller shaft 5*j* are coupled with each other, torque of the second conveying screw 5*b* is never applied on the developing roller shaft, and the developing roller shaft can be easily rotated. Accordingly, when the phases of the track grooves (the outer groove and the inner groove) and the ball are different from each other, and the ball abuts on the outer groove guiding part and the inner groove guiding part at the time of inserting the process cartridge 1 to the apparatus body, and inserting the insertion part of the male joint of the constant velocity joint to the annular space of the female joint, a member on the developing roller shaft side of the constant velocity joint rotates easily, the phases of the ball and the track grooves (the outer groove and the inner groove) match with each other, and the ball can be inserted easily between the track grooves. Accordingly, even when the phases of the track grooves (the inner groove and the outer groove) of the constant velocity joint and the ball are different from each other at the time of inserting the process cartridge 1, the insertion part of the male joint can be inserted into the annular space of the female joint without increasing the insertion resistance of the process cartridge 1.

The coupling unit is attached to the rotation shaft of the rotating body having the largest torque among the rotating bodies of the unit. Thereby, the large torque can be suppressed from being applied on the drive transmission unit on the unit side, and the service life of the drive transmission on the unit side can be made longer.

Because the unit is the process cartridge, the developing roller, the photoconductor, and the like can be rotated at a constant velocity, and favorable images without concentration irregularity, or the banding can be obtained.

The unit includes the photoconductor drive motor as a drive source for rotating the photoconductor as an image carrier, and the development drive motor as a drive source for rotating the rotating body that the developing unit that is an apparatus provided in the process cartridge includes. With this configuration, the photoconductor drive motor never undergoes load variance from the other driving elements, and the photoconductor 2 can be rotation-driven highly precisely.

In this manner, a driven shaft and a drive shaft can be coupled with each other even when the shaft center of the driven shaft and the shaft center of the drive shaft misalign with each other by arranging two pairs of constant velocity joints in series in the shaft direction. When the shaft centers of the drive shaft and the driven shaft misalign with each other, a member on the driven shaft side of the constant velocity joint arranged on the drive shaft side inclines relative to a member on the drive shaft side attached parallel to the drive shaft, and a member on the drive shaft side of the constant velocity joint arranged on the driven shaft side inclines relative to a member on the driven shaft side attached parallel to the driven shaft. As a result, misalignment of the shaft centers of a member attached to the drive shaft of the constant velocity joint arranged on the drive shaft side, and a member attached to the driven shaft of the constant velocity joint arranged on the driven shaft can be canceled out.

A deviation is generated between a non-ball retaining member and a ball retaining member of each constant velocity joint when a drive shaft and a driven shaft are coupled with each other when the shaft centers of the drive shaft and the driven shaft misalign with each other. The constant velocity joint allows transmission of rotation on the drive shaft side at a constant velocity to the driven shaft even when a deviation is generated between the ball non-retaining member, and the ball retaining member. Accordingly, the two pairs of the constant velocity joints transmit rotation on the drive shaft side to the driven shaft at a constant velocity.

According to an aspect of the present invention, by aligning two pairs of the constant velocity joints in series in the shaft direction, the driven shaft and the drive shaft can be coupled with each other even when the shaft center of the driven shaft and the shaft center of the drive shaft misalign with each other, and rotation of the drive shaft can be transmitted to the driven shaft at a constant velocity. As a result, the rotating body of the unit can be rotated at a constant velocity, and formation of abnormal images with concentration irregularity or the like can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A coupling device that couples a driven shaft and a drive shaft in a situation where a processing unit that can be detachably installed in an apparatus body is positioned with respect to the apparatus body, the drive shaft configured to be coupled to a drive source provided in the apparatus body, the driven shaft configured to be coupled to a rotating body provided in the processing unit, the rotating body being at least one of a developing roller, a drive roller of an intermediate image transfer belt, a drive roller of a paper conveying belt, a roller that conveys paper, and a secondary image transfer roller, the coupling device comprising:

two constant velocity joints arranged in series in a shaft direction, the constant velocity joint including,
- a ball non-retaining member that has an annular space with one opened end, the ball non-retaining member having a plurality of track grooves extending in the shaft direction of the ball non-retaining member on an external wall surface or an inner wall surface of the annular space at a constant interval in a circumferential direction, and
- a ball retaining member having a portion that engages with the annular space of the ball non-retaining member, and that retains a ball that slides along each of the track grooves formed in the ball non-retaining member, wherein either one of the constant velocity joints interlocks with attachment and detachment of the processing unit in the apparatus body to engage and separate the ball non-retaining member and the ball retaining member with and from each other.

2. The coupling device according to claim 1, wherein when a constant velocity joint from among the two constant velocity joints coupled to the driven shaft is defined as a first constant velocity joint, and a constant velocity joint from among the two constant velocity joints coupled to the drive shaft is defined as a second constant velocity joint, a member on the drive shaft side of the first constant velocity joint and a member on the driven shaft side of the second constant velocity joint are formed integrally.

3. The coupling device according to claim 2, wherein the ball non-retaining member of the first constant velocity joint, and the ball non-retaining member of the second constant velocity joint are formed integrally.

4. The coupling device according to claim 2, wherein the ball retaining member of the first constant velocity joint, and the ball retaining member of the second constant velocity joint are formed integrally.

5. The coupling device according to claim 1, wherein a retaining mechanism that prevents the ball retaining member from coming off the ball non-retaining member is provided in the ball non-retaining member of the constant velocity joint on which the ball non-retaining member and the ball retaining member are not engaged with or separated from each other interlocking with the attachment and detachment of the unit.

6. The coupling device according to claim 5, wherein the retaining mechanism is a retaining projection that protrudes from an open end of one or both of the external wall surface and the internal wall surface of the annular space of the ball non-retaining member.

7. The coupling device according to claim 6, wherein the open end of the ball non-retaining member of the constant velocity joint on which the ball non-retaining member and the ball retaining member are not engaged and separated with and from each other is elastically deformable, and the retaining projection, and the ball non-retaining member are formed integrally.

8. The coupling device according to claim 1, wherein a ring-shaped elastic material is arranged into any one of the annular space between the ball retaining member of the constant velocity joint on which ball non-retaining member, and the ball retaining member are not engaged and separated with and from each other and the external wall surface of the ball non-retaining member, and the annular space between the ball retaining member and the internal wall surface of the ball non-retaining member or both.

9. The coupling device according to claim 8, wherein a hardness of the elastic material is lower than a hardness of material forming the ball non-retaining member.

10. The coupling device according to claim 1, wherein the ball non-retaining member and the ball retaining member are formed with a resin having slidability.

11. The coupling device according to claim 1, wherein the ball is formed with a resin having slidability.

12. The coupling device according to claim 10, wherein the resin having slidability is a synthetic resin that can be injection-molded.

13. The coupling device according to claim 1, wherein the ball retaining member includes a ball retaining recess for retaining the ball, and a diameter of the ball retaining recess is larger than a diameter of the ball.

14. The coupling device according to claim 1, wherein a distance between the track groove and a surface opposing the track groove is larger than a diameter of the ball.

15. An image forming apparatus comprising:

an apparatus body that includes a drive shaft rotated by a driving force of a driving source;

a processing unit that includes a driven shaft and a rotating body arranged on the driven shaft and that is configured to be detachably installed in the apparatus body, the rotating body being at least one of a developing roller, a drive roller of an intermediate image transfer belt, a drive roller of a paper conveying belt, a roller that conveys paper, and a secondary image transfer roller; and a coupling mechanism that couples the driven shaft and the drive shaft in a situation where the processing unit is positioned with respect to the apparatus body, the coupling mechanism including two constant velocity joints arranged in series in a shaft direction, the constant velocity joint including, a ball non-retaining member that has an annular space with one opened end, the ball non-retaining member having a plurality of track grooves extending in the shaft direction of the ball non-retaining member on an external wall surface or an inner wall surface of the annular space at a constant interval in a circumferential direction, and a ball retaining member having a portion that engages with the annular space of the ball non-retaining member, and that retains a ball that slides along each of the track grooves formed in the ball non-retaining member, wherein either one of the constant velocity joints interlocks with attachment and detachment of the processing unit in the apparatus body to engage and separate the ball non-retaining member and the ball retaining member with and from each other.

16. The image forming apparatus according to claim 15, further comprising:

a clutch in a drive transmission mechanism that transmits drive force of the drive source to the drive shaft, wherein when the coupling mechanism couples the drive shaft and the driven shaft, the clutch cuts coupling between the drive source and the drive shaft.

17. The image forming apparatus according to claim 15, wherein the processing unit includes a plurality of rotating bodies, the image forming apparatus further comprising:

a clutch in a transmission mechanism for transmitting drive force transmitted to the driven shaft of each of the rotating bodies, wherein when the coupling mechanism couples the drive shaft and the driven shafts, the clutches cut coupling between the driven shaft and the unit transmission mechanism.

18. The image forming apparatus according to claim 15, wherein the processing unit includes a plurality of rotating bodies, and the coupling mechanism is attached to a rotation shaft of a rotating body having a largest torque.

19. The image forming apparatus according to claim 15, wherein the processing unit is a process cartridge including an image carrier and a developing unit.

20. The image forming apparatus according to claim 19, further comprising:

a drive source for rotating a rotating body in the process cartridge in addition to a drive source for rotating the image carrier.

* * * * *